US009907106B2

(12) United States Patent
Stanescu et al.

(10) Patent No.: US 9,907,106 B2
(45) Date of Patent: Feb. 27, 2018

(54) DEVICE FOR MULTIPLE PAN ACCESS

(71) Applicants: Razvan-Tudor Stanescu, Bucharest (RO); Sorin Alexandru Bora, Bucharest (RO); George-Lucian Capraru, Rosu (RO)

(72) Inventors: Razvan-Tudor Stanescu, Bucharest (RO); Sorin Alexandru Bora, Bucharest (RO); George-Lucian Capraru, Rosu (RO)

(73) Assignee: NXP USA, Inc., Austin, TX (US)

( * ) Notice: Subject to any disclaimer, the term of this patent is extended or adjusted under 35 U.S.C. 154(b) by 102 days.

(21) Appl. No.: 14/619,624

(22) Filed: Feb. 11, 2015

(65) Prior Publication Data

US 2016/0174218 A1 Jun. 16, 2016

(30) Foreign Application Priority Data

Dec. 10, 2014 (RO) .................................. 2014-00971

(51) Int. Cl.
| | |
|---|---|
| H04W 72/04 | (2009.01) |
| H04W 76/02 | (2009.01) |
| H04W 72/12 | (2009.01) |
| H04W 84/18 | (2009.01) |

(52) U.S. Cl.
CPC ..... *H04W 76/025* (2013.01); *H04W 72/1215* (2013.01); *H04W 84/18* (2013.01)

(58) Field of Classification Search
None
See application file for complete search history.

(56) References Cited

U.S. PATENT DOCUMENTS

| | | |
|---|---|---|
| 5,394,433 A | 2/1995 | Bantz et al. |
| 5,488,609 A | 1/1996 | Hluchyj et al. |
| 6,643,278 B1 | 11/2003 | Panasik et al. |
| 2002/0075941 A1 | 6/2002 | Souissi et al. |
| 2005/0020299 A1 | 1/2005 | Malone et al. |
| 2007/0191042 A1 | 8/2007 | Chung et al. |

(Continued)

OTHER PUBLICATIONS

U.S. Appl. No. 14/564,770, filed Dec. 9, 2014, entitled "Communications Enabled Apparatus With a Multi-Mac Manager and a Method of Operating Therof".

(Continued)

*Primary Examiner* — Kevin C Harper
*Assistant Examiner* — Derrick V Rose

(57) ABSTRACT

A networking device for connection to a plurality of personal area networks is described which operates according to a layer model having a PHY layer, at least a first MAC layer and a second MAC layer, and a third layer situated functionally between the PHY layer and the at least first and second MAC layers. The first and second MAC layers are arranged to support first and second protocol stacks, respectively, to access first and second respective PANs using frequency hopping spread spectrum techniques and first and second sets of parameters respectively. The first and second MAC layers are arranged to provide the first and second sets of parameters, respectively, to the third layer, which is arranged to allocate access to the PHY layer to both the first and second MAC layers in accordance with their respective sets of parameters.

17 Claims, 16 Drawing Sheets

(56) References Cited

U.S. PATENT DOCUMENTS

| | | | | |
|---|---|---|---|---|
| 2008/0117850 | A1* | 5/2008 | Agrawal | H04W 88/06 370/311 |
| 2009/0046673 | A1* | 2/2009 | Kaidar | H04W 48/12 370/337 |
| 2009/0141737 | A1* | 6/2009 | Ho | H04L 12/413 370/447 |
| 2010/0284337 | A1* | 11/2010 | Luft | H04W 84/18 370/328 |
| 2010/0291942 | A1 | 11/2010 | Piipponen et al. | |
| 2013/0258921 | A1* | 10/2013 | Gevorkov | H04W 72/1242 370/311 |
| 2014/0056243 | A1 | 2/2014 | Pelletier et al. | |
| 2015/0263880 | A1* | 9/2015 | Wang | H04W 4/005 370/329 |

OTHER PUBLICATIONS

Notice of Allowance for U.S. Appl. No. 14/564,770, dated Apr. 5, 2017, 5 pages.

Non-Final Office Action dated Nov. 7, 2016 for U.S. Appl. No. 14/564,770, 6 pages.

Non-Final Office Action for U.S. Appl. No. 14/564,770, dated Apr. 27, 2017, 15 pages.

Final Office Action for U.S. Appl. No. 14/564,770, dated Aug. 28, 2017, 16 pages.

Notice of Allowance for U.S. Appl. No. 14/564,770 dated Nov. 15, 2017, 13 pages.

* cited by examiner

DEVICE FOR MULTIPLE PAN ACCESS

CROSS REFERENCE TO RELATED APPLICATION(S)

The present application claims priority to Romanian Patent Application No. RO A 2014 00971, entitled "DEVICE FOR MULTIPLE PAN ACCESS," filed Dec. 10, 2014, the entirety of which is herein incorporated by reference. The present application is related to U.S. patent application Ser. No. 14/564,770, entitled "COMMUNICATIONS ENABLED APPARATUS WITH A MULTI-MAC MANAGER AND A METHOD OF OPERATING THEROF," filed on Dec. 9, 2014, the entirety of which is herein incorporated by reference.

FIELD OF THE INVENTION

This invention relates to a networking device for connection to a plurality of personal area networks (PANs), a method of connecting a networking device to a plurality of personal area networks (PANs), a networking system, a computer program product comprising instructions for causing a networking device to perform a method and a non-transitory tangible computer readable storage medium.

BACKGROUND OF THE INVENTION

Personal area networks, PANs, are short range networks, typically ranging anywhere from a few centimeters to several meters and used to link multiple devices to each other and into networks, often temporarily. PANs allow devices to access communication and digital data services available via other devices or via other networks, for example the internet. In a simple set up a group of devices may form a PAN with a central device which is coupled to the internet, thus allowing devices in the PAN to access internet services.

PANs are typically wireless in nature and can operate using any wireless technology including, but not limited to radio, Bluetooth, ZigBee, Z-Wave, infrared technologies and other technologies including Body Area Network and Wireless USB. However they can also use wired technology including USB and FireWire technologies.

Devices suitable for connection to a PAN include any computing device capable of coupling via a communication technology and includes, but is not limited to, computers, laptops, tablets, palmtops, handheld devices, mobile phones including smart phones, but also includes peripheral devices such as printers, scanners, household monitoring and control devices and any device capable of forming a network node.

Typically a wireless device in a PAN performs a single role and is present in one single physical network at a time in which it can either be set up as a master or slave device.

The occurrence of multiple wireless devices in a PAN requires use of a communication technology which allows the devices to communicate while reducing packet collision, which occurs if two or more devices attempt to transmit on the same frequency at the same time, and interference. One such method is frequency hopping spread spectrum technique (FHSS) which allows the devices in a PAN to hop from one frequency to another, spreading transmissions over available bandwidth. This also utilises bandwidth resources efficiently. A frequency hopping data link layer model implies that access to medium is performed according to a predefined channel hopping pattern, executed at a time interval specified by a slot duration Individual networks have communication schemes which stop their own devices from colliding. However when two or more networks coexist in the same space they are not necessarily aware of each other's frequency hopping spectra and collision may still occur if two devices in two different networks hop to the same or similar frequency and attempt to transmit or receive signals.

US 2002/0075941 describes a system which averts frequency collision and interference between devices in multiple networks in which master devices broadcast FHSS data to each other and to a central controller which coordinates hopping patterns. An adaptive priority system is used to avoid collision between devices.

Generally, while a device may usually only join one network at a time it is possible for devices to be members of multiple PANs. Switching between roles and networks is possible but usually only after a full reconfiguration. This is more complex if a single media interface needs to cope with the requirements of two or more networks with different spread spectrum techniques.

However, a frequency hopping mechanism usually requires that the device starting a network, which may be a PAN Coordinator or master, performs advertising of network hopping pattern parameters, including channel hopping pattern, time slot duration, start of a slot, channel offset, and other parameters which allow participating devices to take part in the PAN. The other network participants, the end devices, or slaves, will scan the medium for a long enough period to receive the advertising packets and configure required MAC/PHY layer parameters necessary to follow the specified channel hopping. Even though participating devices may now take part in a PAN, when a device is part of two or more different PANs collision may still occur if both networks require it to transmit or receive at the same time, or on the same frequency.

SUMMARY OF THE INVENTION

The present invention provides a networking device for connection to a plurality of personal area networks (PANs), a method of connecting a networking device to a plurality of personal area networks (PANs), a networking system, a computer program product comprising instructions for causing a networking device to perform a method and a non-transitory tangible computer readable storage medium as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals.

DETAILED DESCRIPTION OF THE PREFERRED EMBODIMENTS

The present invention is described with reference to the accompanying drawings and figures however the present invention is not limited to the specific examples shown and described herein and as illustrated.

The embodiments shown may be implemented using electronic components, electronic circuits, transmission mechanisms, hardware, software and other technical solutions known in the art and will not be described in any greater detail than necessary to explain the present invention.

The invention may be implemented on a chip, a system on a chip, a computer or other computing device, a network node or other network component.

In the following, for sake of understanding, the device is described in operation. However, it will be apparent that the respective elements are arranged to perform the functions being described as performed by them.

Romanian Application No. RO A201400751 and U.S. application Ser. No. 14/564,770, which claims priority to Romanian Application No. RO A201400751, are hereby incorporated in its entirety herein by reference and describe a solution to accommodate multiple network instances through a single physical interface by allowing multiple MAC layers and introduces a layer, a Multi-PAN Manager (MPM), between the MACs and PHY layers which coordinates the multiple network instances on the MAC layers. The MPM grants or allocates MAC layers access to the PHY layer upon request, issuing them with a message that the PHY is 'busy' (a 'busy status') when this is not possible.

Figure 1:
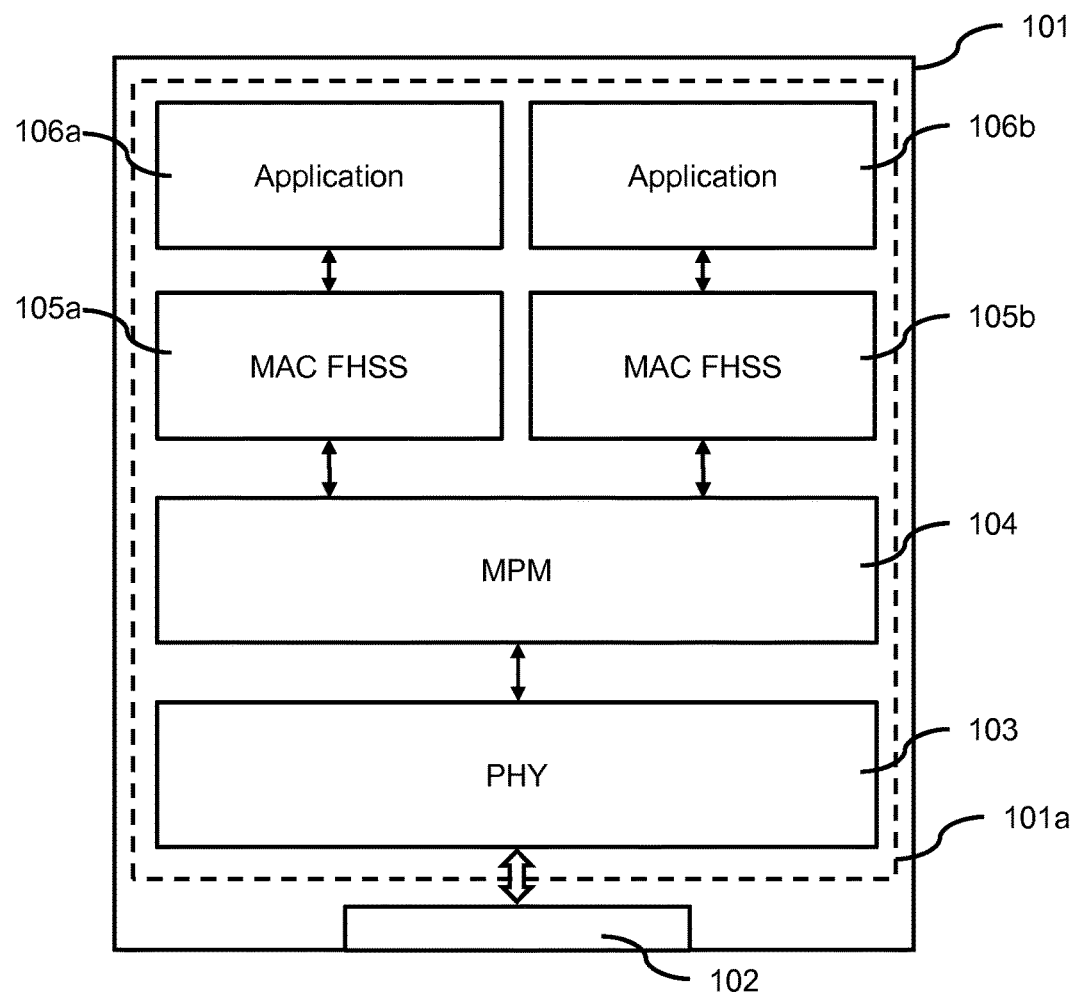
FIG. 1 schematically shows an exemplary personal area networking device.

FIG. 1 schematically shows an exemplary networking device 101 for connection to the plurality of personal area networks (PANs) and having a physical interface 102. The physical interface may be any physical interface capable of connecting to a personal area network, including for example a radio interface which may be a radio or radio transceiver, an infrared interface or a Bluetooth interface. The form of interface 102 and the technology underlying it do not impinge on the invention here described. Device 101 may typically be built from hardware which may include processors, cores, memory and other computing components suitable for running operating systems, OSI layers and other layer models, programs, applications and other computing and computational signalling.

Networking device 101 is arranged to operate according to a layer model 101a with a layer separation similar to the OSI layer separation model and which may comprise a series of layers which may be known from a OSI layer model, or other layer model, and which may include a PHY layer 103 according to the layer model which may be coupled to, or directly together with, the physical interface 102 which may be for control of and signalling to and from the physical interface 102.

Layer model 101a is shown as one bounded software system on hardware separable from the remainder of device 101 with physical interface 102. However, as with any layer model, implementations vary and layer model 101a may also be incorporated into existing device hardware, for example into physical interface 102.

Networking device 101 may also include at least a first MAC layer 105a, according to the layer model, supporting a first protocol stack to access a first respective PAN using frequency hopping spread spectrum (FHSS) techniques and a first set of parameters. The protocol stack may support a first application 106a.

Networking device 101 may also include a second MAC layer 105b, according to the layer model, supporting a second protocol stack to access a second respective PAN using frequency hopping spread spectrum (FHSS) techniques and a second set of parameters. The protocol stack may support a second application 106b.

Networking device 101 may include more than two MAC layers though for simplicity and ease of understanding only two MAC layers are shown in FIG. 1.

Networking device 101 may comprise a third layer 104, according to the layer model, situated functionally between the PHY layer 103 and the at least first and second MAC layers 105a, 105b.

In an embodiment, third layer 104 may be a Multi-Pan Manager (MPM) as described in U.S. application Ser. No. 14/564,770, which claims priority from Romanian Application No RO A201400751 and is hereby incorporated in its entirety herein by reference.

In an embodiment the first MAC layer 105a may be arranged to provide the third layer 104 with the first set of parameters.

In an embodiment the second MAC layer 105b may be arranged to provide the third layer with the second set of parameters.

In an embodiment the third layer 104 may be arranged to allocate access to the PHY layer 103 to both the first and second MAC layers 105a, 105b in accordance with their respective sets of parameters.

The first and second sets of parameters are used by the MAC layers to access their respective PANs and therefore when the MAC layers provide details of their sets of parameters to the third layer it may then coordinate access to the PHY layer for the different MAC layers supporting the protocol stacks and allow them to create or form new PANs or join or commission existing PANs. Collision between the different MAC layers 105a, 105b in the networking device 101 may therefore be avoided, suppressed or reduced in number and/or frequency. The networking device 101 may therefore allow the multiple PANs to be created, formed, joined or commissioned using FHSS via a single physical layer.

In an embodiment, the networking device 101 may enable simultaneous presence in two or more PANs that follow frequency hopping patterns with a single radio interface.

In an embodiment, the MAC layers 105a, 105b are not required to be aware of each other or of a priority based system or of any system which attempts to prioritise one MAC layer over the other.

In an embodiment, restrictions are not imposed on the choosing of a frequency hoping pattern.

In an embodiment, participating stacks keep their existing implementation.

In an embodiment, no hopping pattern reconfiguration is required to accommodate a new coexisting protocol stack on the same third layer or elsewhere in the device.

The personal area networking device is arranged to perform any one of the methods according to the invention that are described below.

Figure 2:
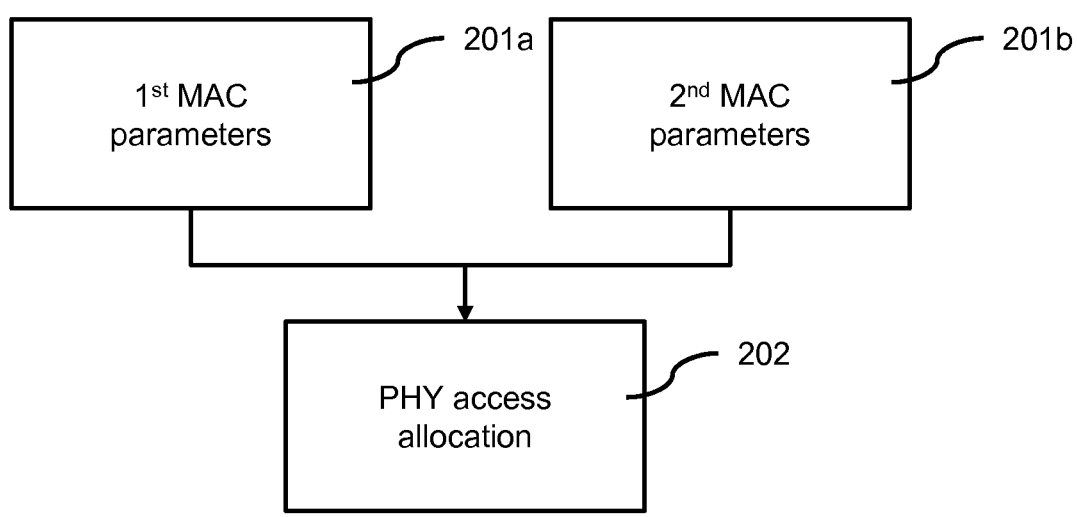
FIG. 2 schematically shows an exemplary method of connecting to a plurality of personal area networks (PANs).

The networking device 101, and arranged to operate according to a layer model comprising a PHY layer according to the layer model, at least a first MAC layer and a second MAC layer according to the layer model, and a third layer (MPM) according to the layer model situated functionally between the PHY layer and the at least first and second MAC layers, and in which the first MAC layer is arranged to support a first protocol stack arranged to access a first respective PAN using frequency hopping spread spectrum (FHSS) techniques and a first set of parameters, and the second MAC layer is arranged to support a second protocol stack arranged to access a second respective PAN using frequency hopping spread spectrum (FHSS) techniques and a second set of parameters, is suitable for a method, shown schematically in FIG. 2, for connecting the networking device to a plurality of personal area networks (PANS). In the method the first MAC layer provides 201a the third layer with first set of parameters, the second MAC layer provides 201b the third layer with the second set of parameters, and the third layer allocates access 202 to the PHY layer to both the first and second MAC layers in accordance with their respective sets of parameters.

In an embodiment, the first and second set of parameters may include at least the following information for time slots allocated to actions to be performed by the first and second MAC layers according to respective first and second frequency hopping patterns:

action duration, where action duration is duration of a transmission (Tx) action or duration of a receiving (Rx) action;
  absolute start time for the allocated time slot for the Tx action or the Rx action;
  time slot duration for the allocated time slot.

In an embodiment, the first set of parameters and/or the second set of parameters may further include other parameters for the correct connection or coupling of the respective MAC layer to a PAN using frequency hopping spread spectrum techniques, and may therefore also include parameters detailing a frequency hopping pattern, allocated frequencies, allocated timing schedules and methods of calculating or deriving such parameters.

In an embodiment, the time slot access model described consists of one point-to-point communication per slot between devices, the devices being master or slave devices. Therefore at a specified moment of time, one device will be performing transmission and the other, or peer, device will be performing reception.

The action chosen to be performed is outside the scope of the invention described herein and it is the application layer responsibility to select when and to whom data transfer is to be performed.

In an embodiment, the third layer 104 may be arranged to grant to any MAC layer of the at least first and second MAC layers 105a, 105b, and according to its respective allocated time slot, access to the PHY layer 103 if the PHY layer is idle.

Therefore a MAC layer protocol stack is not restricted from performing its allotted access to a PAN via the PHY layer if no other MAC layer protocol stack also requires access to a PAN.

In an embodiment and if the PHY interface 102 is idle, any MAC layer requiring access to it is provided access by the first come, first served manner. In an embodiment this situation may be encountered when all the other MAC layers in the networking device 101 stay idle for the duration of a time slot.

The networking device 101 is suitable for a method in which the third layer 104 grants to any MAC layer of the at least first and second MAC layers 105a, 105b and according to its respective allocated time slot, access to the PHY layer 103 if the PHY layer is idle.

However, under normal operation conflicts may arise between MAC layers for the PHY layer. This may occur if both MAC layers attempt a PAN action at or during the same time slot or time period.

When at least two actions overlap the following conflicts may occur:
  Rx-Rx conflict, in which two MAC layers are programmed to receive signals from their respective PANs at the same time or in time slots which overlap;
  Tx-Rx conflict, in which two MAC layers are programmed, one to receive signals from their respective PAN, the other to transmit signals to their respective PAN, at the same time or in time slots which overlap;
  Tx-Tx conflict, in which two MAC layers are programmed to transmit signals to their respective PANs at the same time or in time slots which overlap.

Notwithstanding the above a device operating on multiple PANs may experience over-the-air (OTA) performance degradation as the number of slots used by a PAN increases.

In an embodiment, conflicts may be averted if the third layer 104 is arranged to defer any Tx or Rx action within its allocated time slot as much as its duration allows.

The personal area networking device is suitable for a method in which the third layer 104 defers any Tx or Rx action within its allocated time slot as much as its duration allows.

Figure 3:
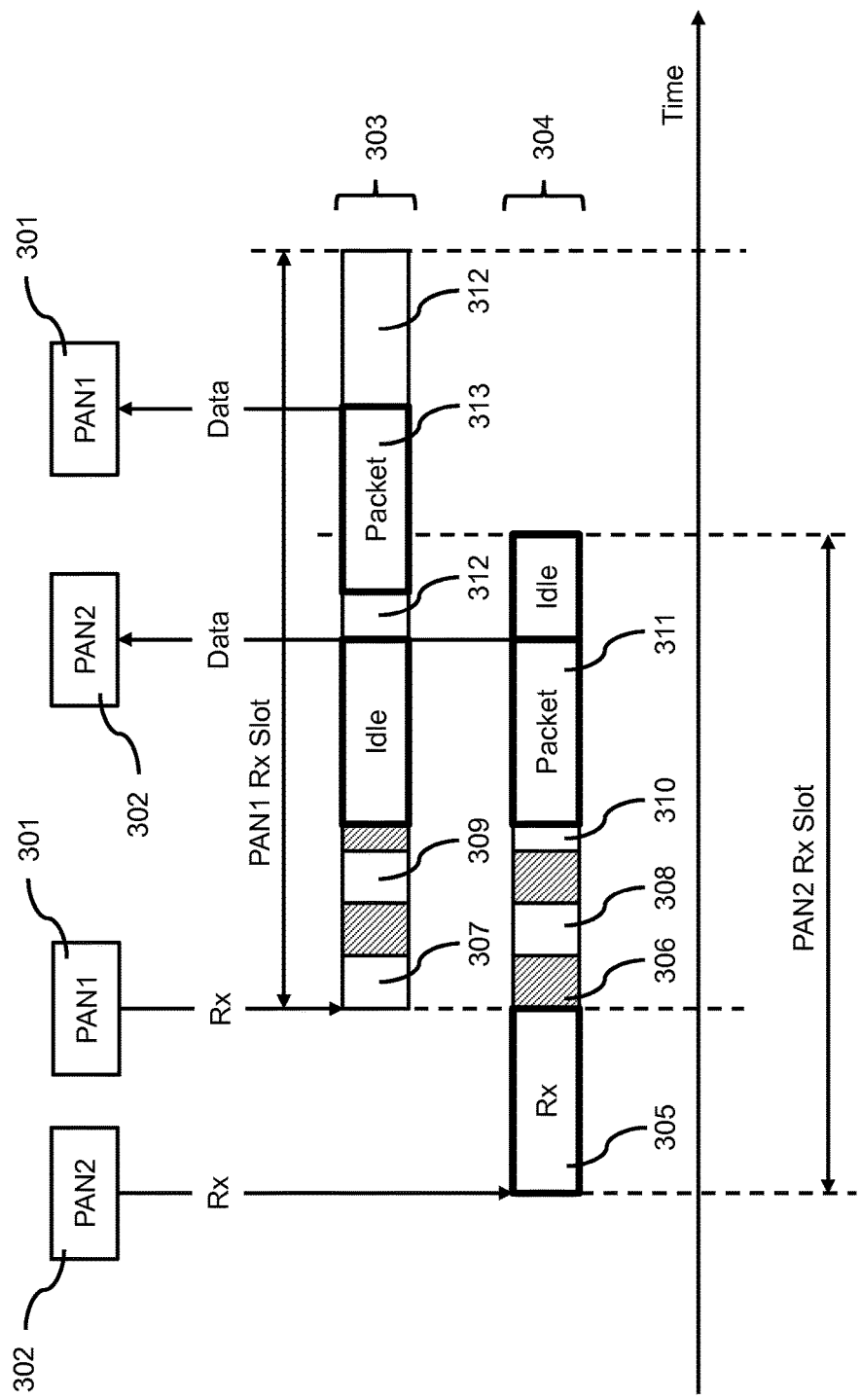
FIG. 3 schematically shows an exemplary method of connecting to a plurality of personal area networks (PANs).

FIG. 3 schematically shows an exemplary method of connecting to a plurality of personal area networks (PANs), in this figure depicted as PAN1 301 and PAN2 302. PAN1 301 is accessed through a first channel 303 and PAN2 302 is accessed through a second channel 304. The first and second channels 303 and 304 may be accessed using the frequency hopping spread spectrum (FHSS) techniques and/or the frequency hopping patterns programmed into respectively two MAC layers supporting frequency hopping protocol stacks. The two MAC layers are programmed, via their hopping patterns, to expect incoming signals respectively from PAN1 301 and PAN2 302 in time slots PAN1 Rx Slot and PAN2 Rx Slot which overlap. This is shown schematically in FIG. 3 whereby the second channel 304 has an allocated time slot, PAN2 Rx Slot, for receipt of signals, and the first channel 303 has an allocated time slot, PAN1 Rx Slot, for receipt of signals. Therefore there is an Rx-Rx conflict.

The Rx-Rx conflict is resolved by the third layer 104, which in an embodiment may be a Multi-Pan Manager, and is arranged to detect when two MAC layers of the at least two MAC layers require access to the PHY layer for Rx actions via time slots which overlap. The third layer 104 may be arranged to alternate access to the PHY layer for the two MAC layers with a dwell time until an incoming signal is detected for one of the MAC layers. The third layer 104 may further be arranged to allocate the PHY layer 103 to the respective MAC layer until the Rx action is completed. The third layer 104 may further be arranged to allocate the PHY layer 103 to the other MAC layer after the Rx action is completed. By alternating access to the PHY layer the networking device 101 alternates between channels 203 and 204 and therefore allows both MAC layers to access their respective PANs.

In an embodiment the incoming signal is a preamble for an incoming packet and the Rx action is receipt of a frame, in which case the third layer may be arranged to alternate channels 203, 204 with a dwell time in search for a preamble or other indication or signature that a signal is arriving for one MAC layer or other. If a preamble, or other indication or signature, is found, the physical interface, acting as receiver, will stay on the channel with the incoming signal until the frame is received. After the frame is received, access is fully granted to the other MAC layer, without performing channel switching like in the initial overlap interval.

Therefore the third layer, which may be a Multi-Pan Manager, and as shown schematically in FIG. 3, first grants access 305 to the MAC layer accessing PAN2 302 and then, when the two time slots overlap, it alternates access to the two MAC layers, so that PAN1 can be accessed 307 and at the same time PAN2 can no longer be accessed 306. After the dwell time access reverts to PAN2 308, then PAN1 309, then PAN2 310 and during the PAN2 access 310 by the respective MAC layer a packet is received 311. The third layer 104 maintains access to PAN2 for the duration of the packet receipt 311 and then transfers access to the physical layer to the MAC layer which is arranged to access PAN1. This MAC layer can then listen for incoming signals 312 and when a packet arrives 313 is able to receive it. After receipt of the packet 313 the third layer maintains access to channel 303 because PAN2 Rx Slot has ended.

The networking device 101 described is suitable for a method in which the third layer 104 detects when two MAC layers 105a, 105b of the at least two MAC layers require access to the PHY layer 103 for Rx actions via time slots which overlap, and alternates access to the PHY layer for the two MAC layers with a dwell time until an incoming signal is detected for one of the MAC layers, allocates the PHY layer to the respective MAC layer until the Rx action is completed, and allocates the PHY layer to the other MAC layer after the Rx action is completed.

Figure 4:
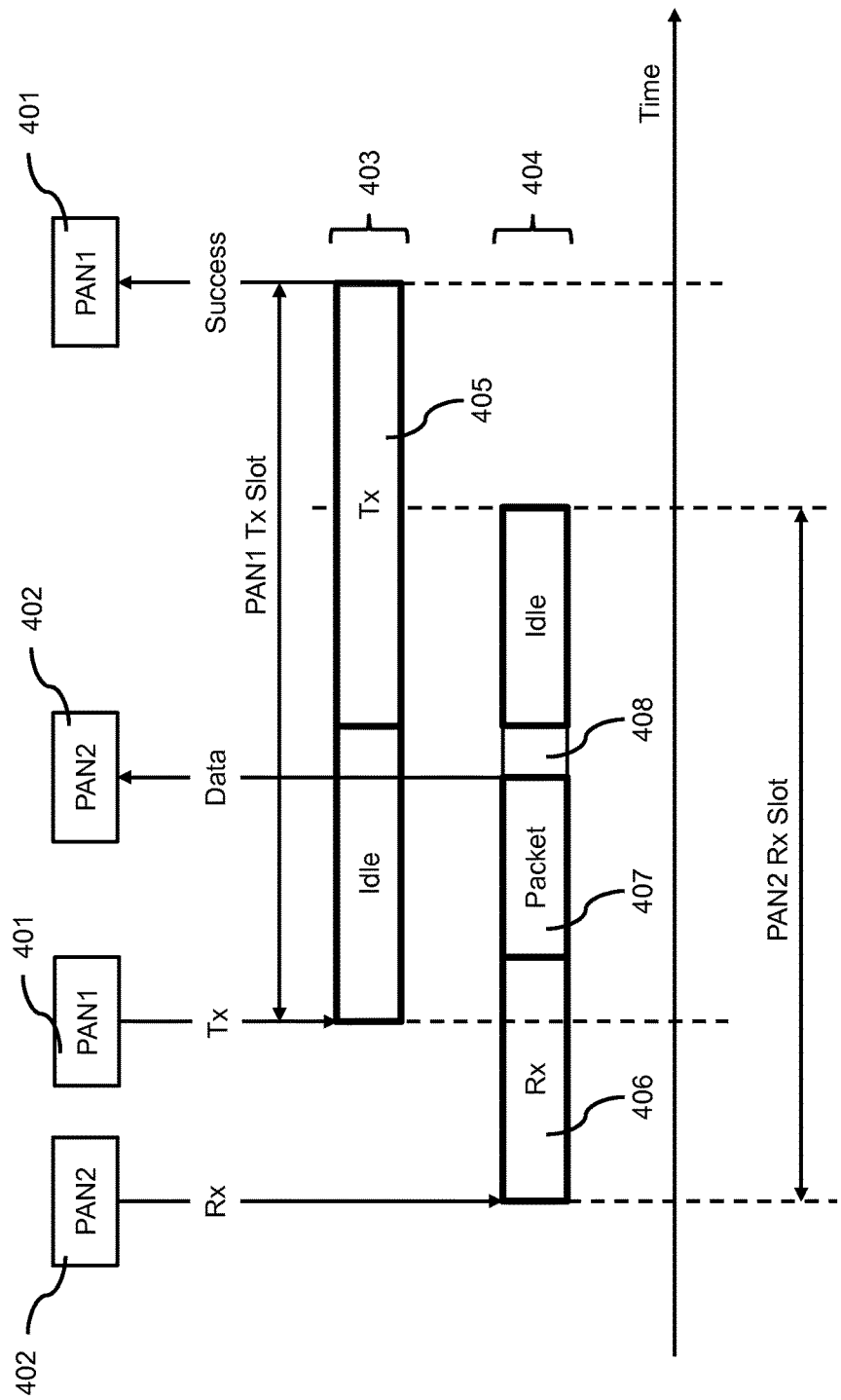
FIG. 4 schematically shows an exemplary method of connecting to a plurality of personal area networks (PANs).

FIG. 4 schematically shows an exemplary method of connecting to a plurality of personal area networks (PANs). Here PAN1 401 and PAN2 402 are accessed respectively via a first channel 403 and a second channel 404. The first and second channels 403 and 404 may be accessed using the frequency hopping spread spectrum (FHSS) techniques and/or the frequency hopping patterns programmed into respectively two MAC layers supporting frequency hopping protocol stacks.

The two MAC layers are programmed, via their hopping patterns, to transmit a signal to PAN1 401, or to expect an incoming signal from PAN2 402 respectively, in time slots PAN1 Tx Slot and PAN2 Rx Slot which overlap. This is shown schematically in FIG. 4 whereby the second channel 404 has an allocated time slot, PAN2 Rx Slot, for receipt of signals, and the first channel 403 has an allocated time slot, PAN1 Tx Slot, for transmission of signals. Therefore there is a Tx-Rx conflict.

The Tx-Rx conflict is resolved by deferring the transmission, or the transmitted signal, towards the end of the time slot as much as its duration allows it, and granting access to the MAC layer which is undergoing receipt of signal for the duration of the overlap.

Therefore in an embodiment, the Tx-Rx conflict is resolved by the third layer 104, which in an embodiment may be a Multi-Pan Manager, and is arranged to detect when two MAC layers 105a, 105b of the at least two MAC layers require access to the PHY layer 103 for, respectively, an Rx action and a Tx action via time slots which overlap. In an embodiment the third layer 104 may be arranged to shift the Tx action towards an edge of the respective timeslot as much as action duration allows in order to be successfully performed, and grant access to the MAC layer for the duration of that action, and grant the MAC layer requiring access for an Rx action access to the PHY layer 103 for the remainder of the overlap period between the two timeslots.

In an embodiment, PHY layer 103 access may be given to the Rx sequence on the overlap period to look for possible incoming packets. However this is not the only possibility and in an alternative embodiment PHY layer access may be given to the Tx sequence first.

An embodiment is shown schematically in FIG. 4 in which the third layer, which may be a Multi-Pan Manager, first grants access 406 to the MAC layer accessing PAN2 402. As an overlap between PAN1 Tx Slot and PAN2 Rx Slot occurs the third layer 104 calculates the duration of transmission that will be required to successfully transmit Tx 405 and allocates Tx 405 to the end of the overlap period between PAN1 Tx Slot and PAN2 Rx Slot. This allows the second channel 404 to receive packet 407 during which time the first channel 403 is idle. Following receipt of packet 407 the second channel 404 is granted access to the PHY layer to scan for other incoming packets. During transmission of Tx 405 on the first channel 403, the second channel 404 is idle.

The personal area networking device described is suitable for a method in which the third layer 104 detects when two MAC layers 105a, 105b of the at least two MAC layers require access to the PHY layer 103 for, respectively, an Rx action and a Tx action via time slots which overlap, and shifts the Tx action towards an edge of the respective timeslot as much as action duration allows in order to be successfully performed and grants access to the MAC layer for the duration of that action, and grants the MAC layer requiring access for an Rx action access to the PHY layer 103 for the remainder of the overlap period between the two timeslots.

If, in FIG. 4 an incoming signal, or preamble, be detected close to the transmission start time and its full reception overlaps transmission, for example if an incoming packet is detected during period 408 and is too large to be fully received during time period 408, the packet is discarded.

Therefore the personal area networking device is also suitable for a method wherein when the Rx action is receipt of a packet which cannot be fully received in the remaining overlap period, the third layer discards the packet.

Figure 5:
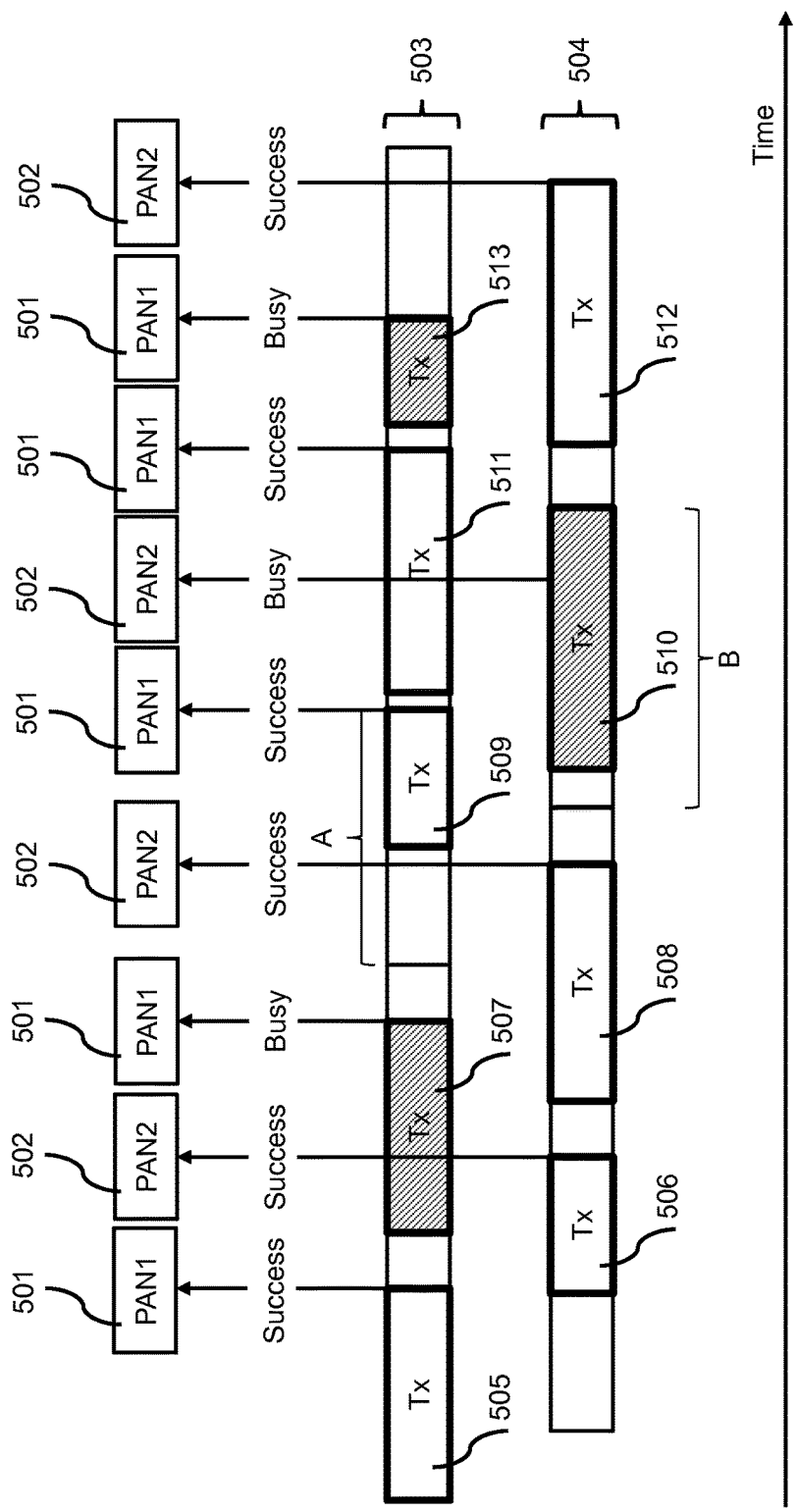
FIG. 5 schematically shows an exemplary method of connecting to a plurality of personal area networks (PANs).

FIG. 5 schematically shows an exemplary method of connecting to a plurality of personal area networks (PANs) in this figure depicted as PAN1 501 and PAN2 502. PAN1 501 is accessed through a first channel 503 and PAN2 502 is accessed through a second channel 504. The first and second channels 503 and 504 may be accessed using the frequency hopping spread spectrum (FHSS) techniques and/or the frequency hopping patterns programmed into respectively two MAC layers supporting frequency hopping protocol stacks. The two MAC layers are programmed, via their hopping patterns, to transmit signals respectively to PAN1 501 and PAN2 502 in sequences which overlap. Therefore there is a Tx-Tx conflict.

The Tx-Tx conflict is resolved by the third layer 104, which in an embodiment may be a Multi-Pan Manager, and may be arranged to detect when two MAC layers 105a, 105b of the at least two MAC layers require access to the PHY layer 103 for Tx actions via time slots which overlap. The third layer may be arranged to shift Tx actions as much as possible towards the edges of their respective time slot while ensuring that they do not overlap. When a Tx action starts the third layer 104 may be arranged to grant the respective MAC layer access to the PHY layer 103 and increase a priority of the other MAC layer if that MAC layer requires access to the PHY layer 103 during the Tx action. The third layer 104 may be arranged to reduce the priority of that MAC layer again if that MAC layer subsequently transmits. During any subsequent conflict the third layer 104 may be arranged to grant access to the MAC layer with the highest priority.

A Tx-Tx conflict is complex and the management by the third layer 104 may be performed using a priority based system. When a transmission is successfully performed from one MAC the other MAC layer is allocated an increased priority.

In embodiments when the third layer 104 is a Multi-PAN Manager the priority is increased each time a PHY busy status is issued to the MAC.

Following a subsequent successful transmission the priority of a MAC layer will be decreased.

In an embodiment further conflicts are managed through deferral as long as Tx duration allows it, then the MAC with the highest priority is granted access.

This is shown schematically in FIG. 5 in which the first transmission Tx 505 occurs on the first channel 503 and another transmission Tx 506 is deferred by action 505. During transmission of Tx 506 the next transmission action, Tx 507, is denied and its priority is increased. Meanwhile, action 508 is performed and action 509 is deferred to the end of its time slot A and the priority of the MAC using channel 1 503 is decreased, a transmission action having been performed. During performance of Tx 509 an action an action on channel 2, Tx 510, cannot be performed even when it is deferred to the end of its timeslot B. However, the non-performance of Tx 510 leaves the PHY layer 103 open and transmission Tx 511 can be performed via the first channel 503. Since Tx action 510 is denied its priority is increased and therefore subsequent Tx 512 has higher priority and gains access to the PHY layer 103 instead of Tx 513, which is denied.

The device is suitable for a method in which the third layer 104 detects when two MAC layers 105a, 105b of the at least two MAC layers require access to the PHY layer 103 for Tx actions via time slots which overlap, shifts Tx actions as much as possible towards the edges of their respective time slot while ensuring that they do not overlap, then when a Tx action starts, grants the respective MAC layer access to the PHY layer 103 and increases a priority of the other MAC layer if that MAC layer requires access to the PHY layer 103 during the Tx action, reducing the priority again if that MAC layer subsequently transmits, and during any subsequent conflict, grants access to the MAC layer with the highest priority.

Figure 6:
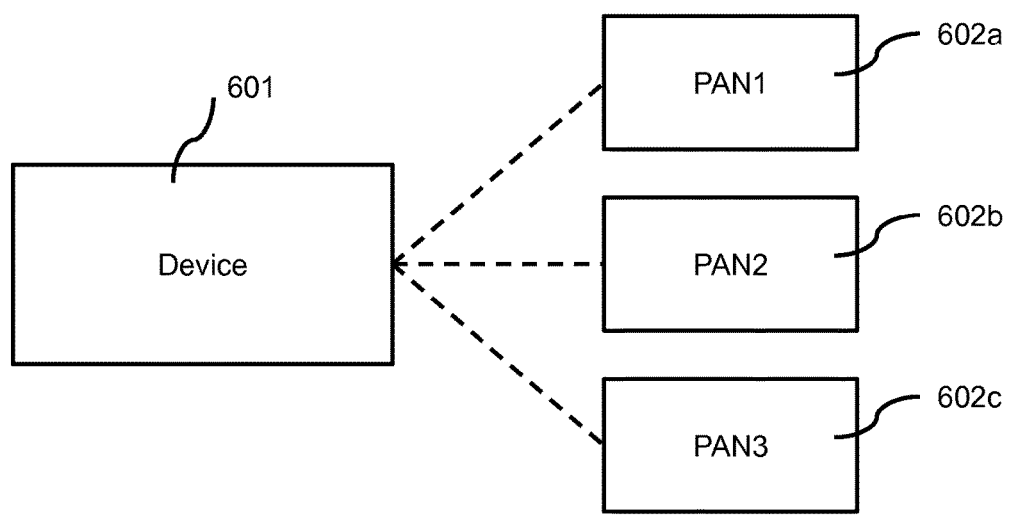
FIG. 6 schematically shows an exemplary system comprising a personal area networking device.

FIG. 6 schematically shows an exemplary system comprising a networking device 601 as described above and which using the methods described above is coupled to a plurality of personal area networks (PANs) 602a, 602b and 602c. FIG. 6 shows three PANs but a number of PANs more than three or less than three may to created, formed, joined or commissioned using the methods as described above.

The methods as described may allow the creation, forming, joining or commissioning of multiple networks from a single PHY layer.

The method may enable simultaneous presence in two or more networks that follow frequency hopping patterns with a single radio interface.

Figure 7:
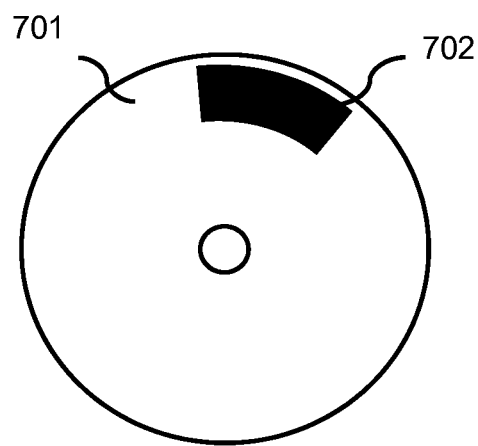
FIG. 7 schematically shows a computer readable medium comprising a computer program product.

FIG. 7 shows a computer readable medium 701 comprising a computer program product 702, the computer program product 702 comprising instructions for causing a networking device comprising a PHY layer according to the layer model, at least a first MAC layer and a second MAC layer according to the layer model, and a third layer according to the layer model and situated functionally between the PHY layer and the at least first and second MAC layers, the first MAC layer being arranged to support a first protocol stack arranged to access a first respective PAN using frequency hopping spread spectrum (FHSS) techniques and a first set of parameters, and the second MAC layer being arranged to support a second protocol stack arranged to access a second respective PAN using frequency hopping spread spectrum (FHSS) techniques and a second set of parameters, to perform a method in which the first MAC layer provides the first set of parameters to a third layer, the second MAC layer provides the second set of parameters to the third layer, and the third layer allocates access to the PHY layer to both the first and second MAC layers in accordance with their respective sets of parameters.

Figure 8:
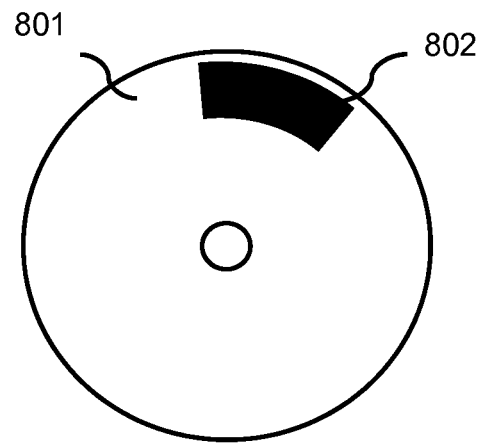
FIG. 8 schematically shows a non-transitory tangible computer readable storage medium.

The computer program product 702 may be embodied on the computer readable medium 701 as physical marks or by means of magnetization of the computer readable medium 701. However, any other suitable embodiment is conceivable as well. Furthermore, it will be appreciated that, although the computer readable medium 701 is shown in FIG. 7 as an optical disc, the computer readable medium 701 may be any suitable computer readable medium, such as a hard disk, solid state memory, flash memory, etc., and may be non-recordable or recordable. The computer readable medium may be a non-transitory tangible computer readable storage medium 801, as shown schematically in FIG. 8, comprising data 802 loadable in a programmable apparatus, the data 802 representing instructions executable by the programmable apparatus, said instructions comprising one or more receiving instructions for receiving data from a first MAC layer representing a first set of parameters, one or more receiving instructions for receiving data from a second MAC layer representing a second set of parameters, and one or more allocating instructions for allocating access to a PHY layer to both the first and second MAC layers in accordance with their respective sets of parameters.

The third layer, which may be a multi-Pan Manager (MPM), may be provided in the following way.

Figure 9:
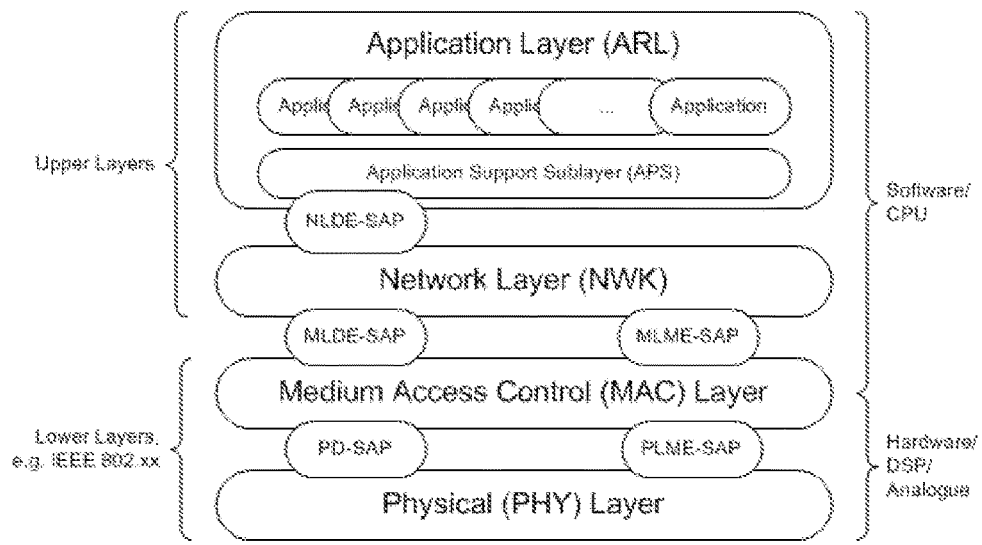
FIG. 9 schematically shows a block diagram illustrating a communication layer model.

As shown in FIG. 9, a physical (PHY) layer and a medium access control (MAC) layer may be implemented based on the OSI model and further exemplarily on the basis of the IEEE 802.15.14 standard. The physical (PHY) layer functions and medium access control (MAC) layer functions may be also determined by the hardware in addition to IEEE 802.15.4. Above the medium access control (MAC) layer, there is a network (NWK) layer, which adapts the physical (PHY) layer functions and medium access control (MAC) layer functions to suit the upper layers.

Service access points (SAPs) are conceptual locations and interfaces, respectively, at which one OSI layer can request the services of another OSI layer. As an example, PD-SAP or PLME-SAP in IEEE 802.15.4 can be mentioned, where the medium access control (MAC) layer requests certain services from the physical (PHY) layer.

The service access points (SAPs) are denoted according to the layer, with which they are associated: NLDE-SAP (network (NWK) layer data entity-service access point), NLME-SAP (network (NWK) layer management entity-service access point), MLDE-SAP (medium access control (MAC) layer data entity-service access point), MLME-SAP (medium access control (MAC) layer management entity-service access point), PD-SAP (physical device-service access point) and PLME-SAP (physical (PHY) layer management entity-service access point).

For instance, the MLME-SAP (medium access control (MAC) layer management entity-service access point) is the management service interface of medium access control (MAC) layer providing to network (NWK) layer and the PLME-SAP (physical (PHY) layer management entity-service access point) is the management service interface of physical (PHY) layer providing to medium access control (MAC) layer. The NLDE-SAP (network (NWK) layer management entity-service access point) is the data service interface of network layer providing for the application layer and the MLME-SAP (medium access control (MAC) layer management entity-service access point) is the data service interface of medium access control (MAC) layer providing for the network (NWK) layer.

The application support sublayer (APS) situated above the medium access control (MAC) layer defines the logical appliance type (device type) in the network, multiplexes the incoming data and is responsible for security mechanisms. Above the application support sublayer (APS), there are arranged the applications, which may be embedded in an application framework. The application support sublayer (APS) is connected to the applications via APSDE-SAPs (application support sublayer (APS) device entity-service access points) (not shown).

Figure 10:
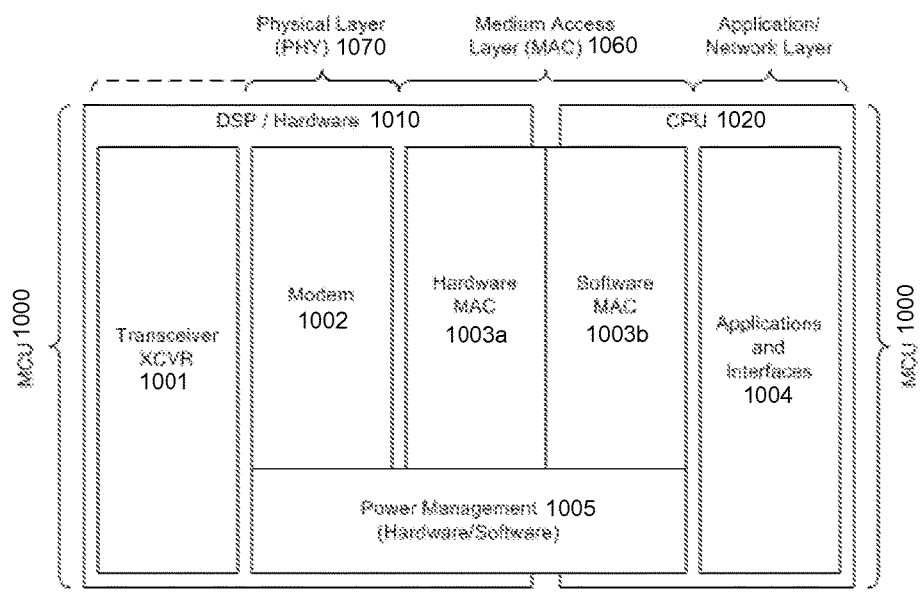
FIG. 10 depicts a schematic block diagram of an exemplary implementation of communication layers.

A schematic block diagram of an exemplary implementation of the functionalities of the different aforementioned layers is shown in FIG. 10.

An analogue transceiver (XCVR) 1001 may provide the interface between the transmission media (cable, RF, optical fiber) and digital modem for transmission and be associated with the transmission channel. The transceiver 1001 may for instance considered to form the analogue portion of the physical (PHY) layer. The digital portion of the physical (PHY) layer 1070 may be comprised of the digital modem 1002, which is facilitated with a DSP in a DSP/hardware block 1010. The DSP/hardware block 1010 includes the digital modem 1002, which is considered as a portion of the physical (PHY) layer 1070, in conjunction with the transceiver (XCVR) 1001. The hardware block 1010 also includes a hardware portion 1003a of the medium access control (MAC) layer 1060. A power management function 1005 may be also facilitated partly in the hardware block 1010 and partly in an MCU/CPU domain 1020. The MCU/CPU (microcontroller unit/central processing unit) domain 1020 includes a software portion 1003b of the medium access control (MAC) layer, the software medium access control (MAC) layer and includes a portion of the power management functionality 1005. The MCU/CPU domain 1020 is also illustrated as containing the (customer) application and the interface 1004, as was described herein above. The exemplary illustrated implementation may be understood as a schematically illustrative example of a software defined radio (SDR), which extends from the customer interface all the way to the analogue transceiver (XCVR) 1001. By incorporating the modem 1002 in a DSP architecture, it can be configured with software to facilitate not only one standard such as the 802.15.4 standard but also other standards such as 802.xx standards, if desired. Further, the customer application can be changed in the MCU domain 1020.

Figure 11A:
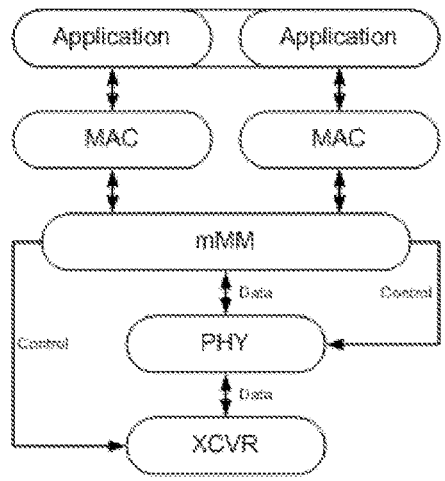
FIGS. 11a to 11c schematically show simplified block diagrams illustrating exemplary implementations of a multi-MAC manager (mMM) according to examples of the present invention on the basis of a communication layer model.
Figure 11B:
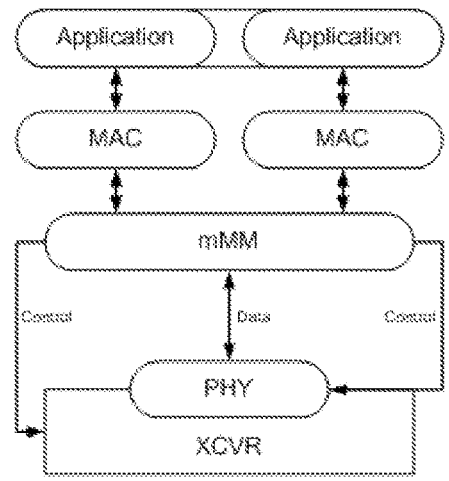
Figure 11C:
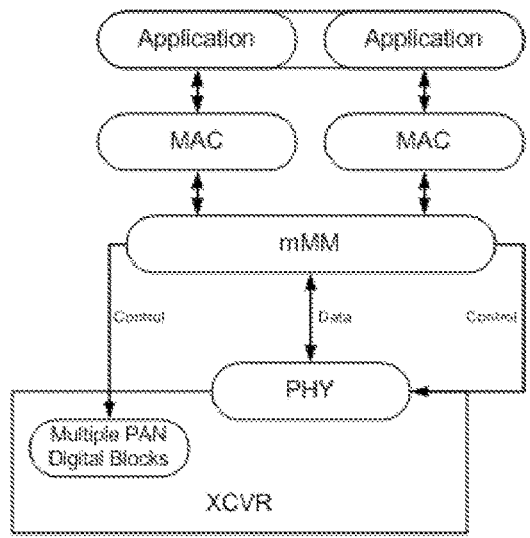

On the basis of the above description relating to the OSI (Open System Interconnection) layer model for abstraction of network stack implementation, exemplary implementations of examples of the present application will be understood. FIGS. 11a to 11c schematically show OSI layer models of examples of the present invention. The examples schematically illustrate a multi-MAC manager (mMM) interposed between the medium access control (MAC) layer and the physical (PHY) layer and the transceiver (XCVR) thereof, respectively. The multi-MAC manager (mMM) is suggested to interface directly to the service access points (SAPs) of the medium access control (MAC) layer and the service access point (SPAs) of the physical (PHY) layer. From upper layer perspective, multiple coordinated medium access control (MAC) instances are available for being used by application in particular at the same time and more particularly on multiple channels of the same data communication medium. Depending on the implementation of the multi-MAC manager (mMM), the applications in the application layer may be aware of the multiple coordinated medium access control (MAC) instances. For instance, the applications are executable in a single application framework and access to and may make use of anyone of the multiple coordinated medium access control (MAC) instances. The multiple coordinated medium access control (MAC) instances are assigned to the single application framework. Alternatively, several application frameworks may be present, within each of which one or more applications are executable and each of which is associated with one of the multiple coordinated medium access control (MAC) instances. In the first case, the applications in the application layer may have access to and may make use of any of the multiple coordinated medium access control (MAC) instances for network communications. In the other case the one or more applications of one application layer of the plurality thereof may have access to and may make use of the medium access control (MAC) instance of the plurality thereof assigned to the respective one application layer.

The multiple coordinated medium access control (MAC) instances interfaces the several (one, two or more) medium access control (MAC) instances to a single physical (PHY) layer. The logical communications requests from the several medium access control (MAC) instances (or several data link layer instances) are translated by the single physical (PHY) layer into hardware-specific operations to effect transmission and/or reception of electronic signals in accordance with the logical communications requests. The multi-MAC manager (mMM) is responsible for granting the access of a medium access control (MAC) instance to the physical (PHY) layer, e.g. granting the right to access and granting the (physical) access to the services provided by the physical (PHY) layer and the communication medium, respectively, when the transmission medium is available.

The integration of the multi-MAC manager (mMM) between physical (PHY) layer and data link layer and medium access control (MAC) layer, respectively, may depend on the concrete, practical hardware implementation of the OSI layers in a device according to an example of the present invention. As illustrated in FIGS. 11a to 11c, the multi-MAC manager (mMM) is integratable into different hardware implementations. The multi-MAC manager (mMM) may make use of hardware acceleration of the functionalities of different OSI layers, in particular hardware acceleration of the physical (PHY) layer and/or the transceiver (XCVR). On the basis of the following description of the operability and the operative interoperability of the multi-MAC manager (mMM) according to an example of the present application with the further exemplary units of the apparatus the skilled person enabled to carry out the teaching of the present invention. In particular, it will be understood by those skilled in the art that the multi-MAC manager (mMM) as suggested in the present application is adaptable to fulfill its role in different protocol stack implementations. More particularly, the multi-MAC manager (mMM) as suggested in the present application may make use of the interfaces of the different layers described in brief above with reference to the service access points (SAPs), which may be defined on the basis of one or more standards.

Figure 12:
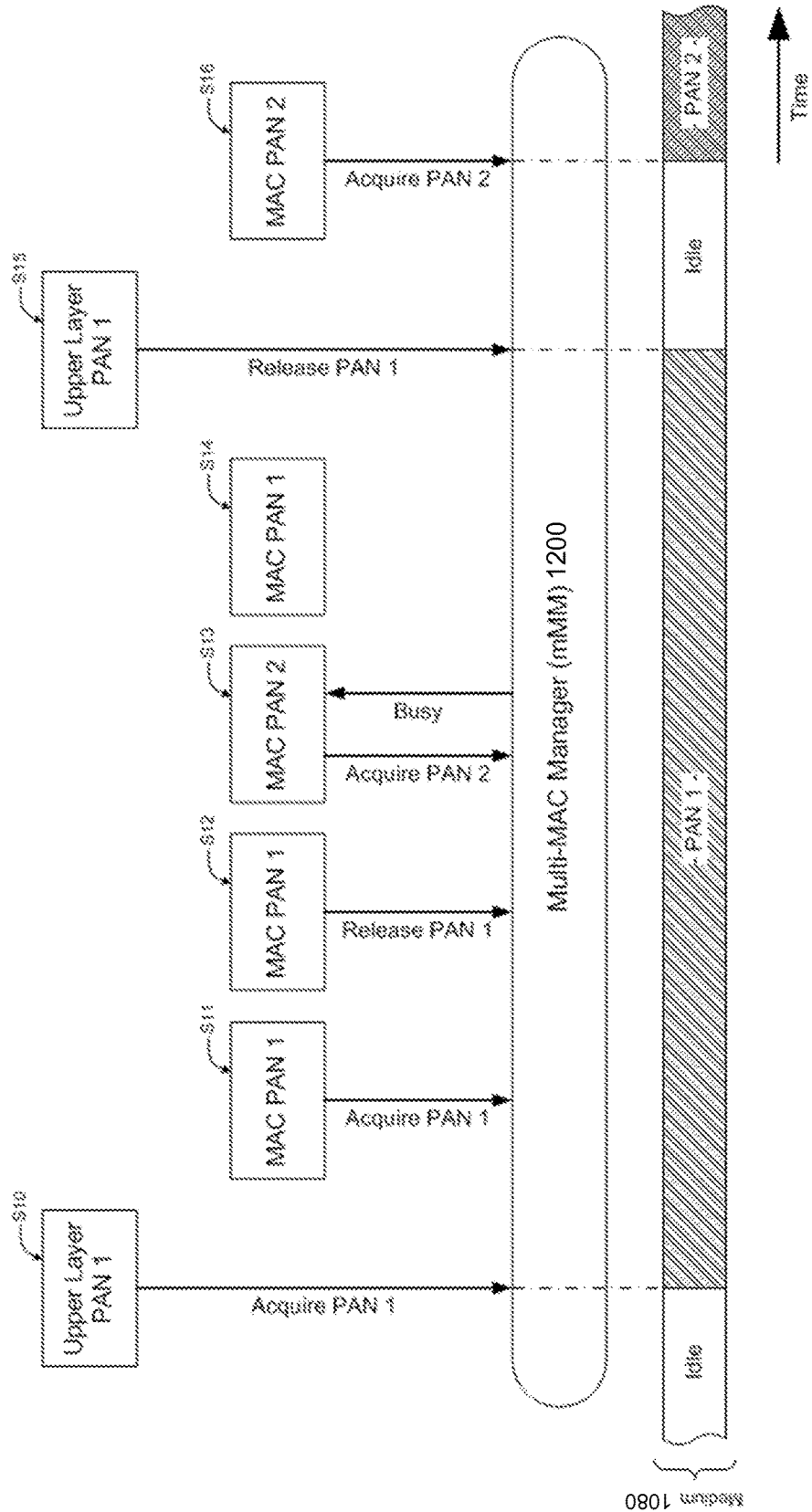
FIG. 12 schematically shows a simplified flow diagram illustrative of timely allocations of a communication medium to a medium access control (MAC) instance according to an example of the present invention.

Referring to FIG. 12, an illustrative operation of the multi-MAC manager (mMM) according to an example of the present invention is schematically illustrated with reference to two medium access control (MAC) instances. The medium access control (MAC) instances allow an apparatus implementing the exemplary multi-MAC manager (mMM) to act in two roles, which may be different roles but not limited thereto, on the same communication medium:
- as an entity (or network entity) participating in a first personal area network (PAN 1), and
- as an entity (or network entity) participating in a second personal area network (PAN 2).

In principle, the multi-MAC manager (mMM) according to an example of the present invention enables to implement several network identities or nodes from the network's perspective using a single physical layer and transceiver, respectively. The apparatus implementing the multi-MAC manager (mMM) appears as several virtual apparatuses coexisting at the same time and connected to the same communication medium e.g. on multiple channels thereof. Each medium access control (MAC) instance inter alia defines a respective (network) identity, such as MAC address and identities related thereto and derived thereof, from the network's point of view, respectively, where each (network) identify is considered as an individual and independent apparatus enabled for network communication in accordance with a defined transport specification and role. The transport specification includes inter alia but is not limited thereto Bluetooth and ZigBee transport. In the context of the description of the present invention, it should be understood that the layers referred to implement functionalities and services required for the one or more transports, protocols etc. supported by the apparatus implementing a multi-MAC manager (mMM) according to an example of the present invention. From application layer point of view, each medium access control (MAC) instance may be understood to represent an individual and independent protocol stack useable by one or more applications and providing data communications services thereto (e.g. communications services in respect of the medium access control (MAC) instance).

In an operation S10, the right to access a communication medium is limited to a specific medium access control (MAC) instance upon reception of a request to acquire a network identity of a specific personal area network (PAN), wherein the acquisition request is issued by an upper layer and received by the multi-MAC manager (mMM). As illustrated in FIG. 12, the acquisition request is exemplarily dedicated to request the grant of the right to access the communication medium to the medium access control (MAC) instance relating to the network identity for the first personal area network (PAN 1). In the following, the phrase network identity for the first personal area network (PAN 1) will be also denoted as first (network) identity for the sake of intelligibility. Further, the term access should be understood to include, but not limited thereto, polling of data, receiving of data, transmitting of data and/or listening for data. Provided that the physical (PHY) layer and/or the communication medium is/are available, e.g. the physical (PHY) layer and/or the communication medium is currently not allocated to another network identity, the communication medium is idle or an idle state operation is currently performed, which may be interrupted, the right to access is granted and limited to the requested network identity such as the first network identity. In other words, the physical (PHY) layer and the communication medium are exclusively available for requests relating to the first network identity and such requests are passed through by the multi-MAC manager (mMM). Exclusively availability should be understood that upon a successful acquisition request issued by an upper layer the communication medium is exclusively allocated for control and payload data transactions relating to the first personal area network (PAN 1). From a network point of view, the apparatus exposes the medium access control (MAC) instance corresponding to the first personal area network (PAN 1) and acts within the first personal area network (PAN 1) accordingly. Upon a successful acquisition request, the physical (PHY) layer and units associated therewith may be configured in accordance with configuration settings provided by the multi-MAC manager (mMM) for the respective medium access control (MAC) instance corresponding to the first personal area network (PAN 1). Exclusive availability is maintained until the upper layer issues a request to release the exclusive allocation as exemplarily illustrated in operation S15.

It should be understood that the right to get granted the access to a communication medium is not only obtainable by an acquisition request issued by an upper layer. On the contrary, such acquisition may also be obtained through the medium access control (MAC) layer and in particular through the medium access control (MAC) layer in respect of specific a medium access control (MAC) instance. In a following operation S11, the first network instance may be acquired in response to an operation of the medium access control (MAC) layer for instance due to invocation of a service provided by the medium access control (MAC) instance corresponding to the first network entity (PAN 1). In the example illustrated in FIG. 12, the medium access control (MAC) instance for the first personal area network (PAN 1) has already access to the physical (PHY) layer and the communication medium due to the previous allocation in operation S10 upon acquisition request from the upper layer. Hereinafter, any data poll requests, data transmit requests or the like relating to the medium access control (MAC) instance corresponding to the first network entity (PAN 1) are immediately passed to the physical (PHY) layer and further to the communication medium 1080, respectively.

In an operation S12, the allocation of the medium access control (MAC) instance corresponding to the first personal area network (PAN 1) may be released after an acquisition operation as illustrated with respect to operation S11. However, as illustrated in the example shown in FIG. 12, the allocation to the network entity of the personal area network (PAN 1) may be maintained until an upper layer, preferably the upper layer, which has originally requested the acquisition, requests to release the allocation thereto such as exemplarily illustrated in operation S15.

As long as the communication medium and the physical (PHY) layer is allocated to the first personal area network (PAN 1), respectively, acquisitions for other medium access control (MAC) instances such as shown in operation S13 of FIG. 12 are rejected. As exemplarily illustrated with reference to operation S13, any attempt to acquire the medium access control (MAC) instance corresponding to the second personal area network (PAN 2) (in other words the allocation of communication medium and the physical (PHY) layer for access thereto relating to the second personal area network (PAN 2), respectively) may be responded with a rejecting response such as a PHY (physical layer) busy response emulated by the multi-MAC manager (mMM).

As illustrated in operation S16, the attempt to acquire the second personal area network (PAN 2) is successful since the communication medium is idle and available at this point in time, respectively.

The maintaining of the allocation of the first personal area network (PAN 1) upon request to acquire the first personal area network (PAN 1) issued by an upper layer until a subsequent request to release (as exemplarily illustrated with regard to the operations S10 and S15 in FIG. 12) is in particular applicable in case a service of this upper layer is requested by an application. Such requested service offered by an upper layer may involve one or more (atomic) requests issued by lower layers which may be bound to a predefined sequence of operations, may be time critical, e.g. may have a predefined timing in accordance with a defined schedule, and/or have to be processed uninterruptedly. Accordingly, the allocation of e.g. the physical (PHY) layer to the medium access control (MAC) instance such as the first personal area network (PAN 1) should have to be maintained and the allocated physical access, e.g. the allocation of the communication medium to the medium access control (MAC) instance such as the first personal area network (PAN 1), should not be taken away in case the upper layer service requested by an application involves a sequence of requests, which have to be performed within time frame and/or sequential constrains to allow for a successful completion.

In order to enable the aforementioned operation of the multi-MAC manager (mMM), one or more service access points (SAPs) may be exposed to and accessible for one or more upper layers, in particular, the application layer, application support sublayer and/or application framework, to enable acquisition and release of a medium access control (MAC) instance and allocation of the physical (PHY) layer and communication medium, respectively. However as aforementioned, it should be noted that the acquisition and release a medium access control (MAC) instance and allocation of the communication medium and the medium access control (MAC) layer may not be only limited to acquisition requests from any upper layers. Such acquisition may be obtained upon request from and/or service invocation of any layer as exemplarily illustrated with regard to S16 of FIG. 12. Such acquisition should be successful if the communication medium is available, which means that communication medium is idle or an (idle) operation currently performed is interruptible.

Following examples should further illustrate the operation of the multi-MAC manager (mMM). For instance the IEEE 802.15.4 standard and further standards prescribe that during idle, which means that the medium access control (MAC) layer of a network apparatus does not perform a data exchange procedure such as polling data, transmitting data or receiving data. For instance, the network apparatus may listen on the communication medium whether there is incoming data targeting it. Accordingly, the transceiver (XCVR) and the medium access control (MAC) layer are set into listening operation mode, respectively. The listening operation mode and procedure thereof are performed with respect to a medium access control (MAC) instance. Such listening operation mode and the procedure thereof may be interrupted upon request for e.g. pulling data or transmitting data in respect of another medium access control (MAC) instance. A request may trigger the interruption and once the request in respect of the other medium access control (MAC) instance is completed, the listening operation mode and procedure thereof may be resumed. Further, in case two or more medium access control (MAC) instances require listening on the communication medium for incoming data the listening operation mode and procedure thereof may be performed in time scheduled alternation, in particular in periodic time cycles, which may have the same or different periods for instance according to priority ratings. The time periods may be adapted at runtime. The listening procedure may be performed on different channels of the communication medium in accordance with the respective medium access control (MAC) instance.

Further, the IEEE 802.15.4 standard and further standards prescribe that a scan operation performed with respect to one medium access control (MAC) instance may be not interrupted such as by any requests from other medium access control (MAC) instances or upper layer requests relating other medium access control (MAC) instances. In such a case, the allocation of the communication medium and the medium access control (MAC) is acquired exclusively for the one medium access control (MAC) instance until the scan operation is completed. Similar, an exclusive allocation of communication medium and the medium access control (MAC) layer for one medium access control (MAC) instance may also be necessary in case the (atomic) operations of a sequence of operations may not be interrupted to ensure successful completion of the sequence of operations as already mentioned above.

Figure 13:
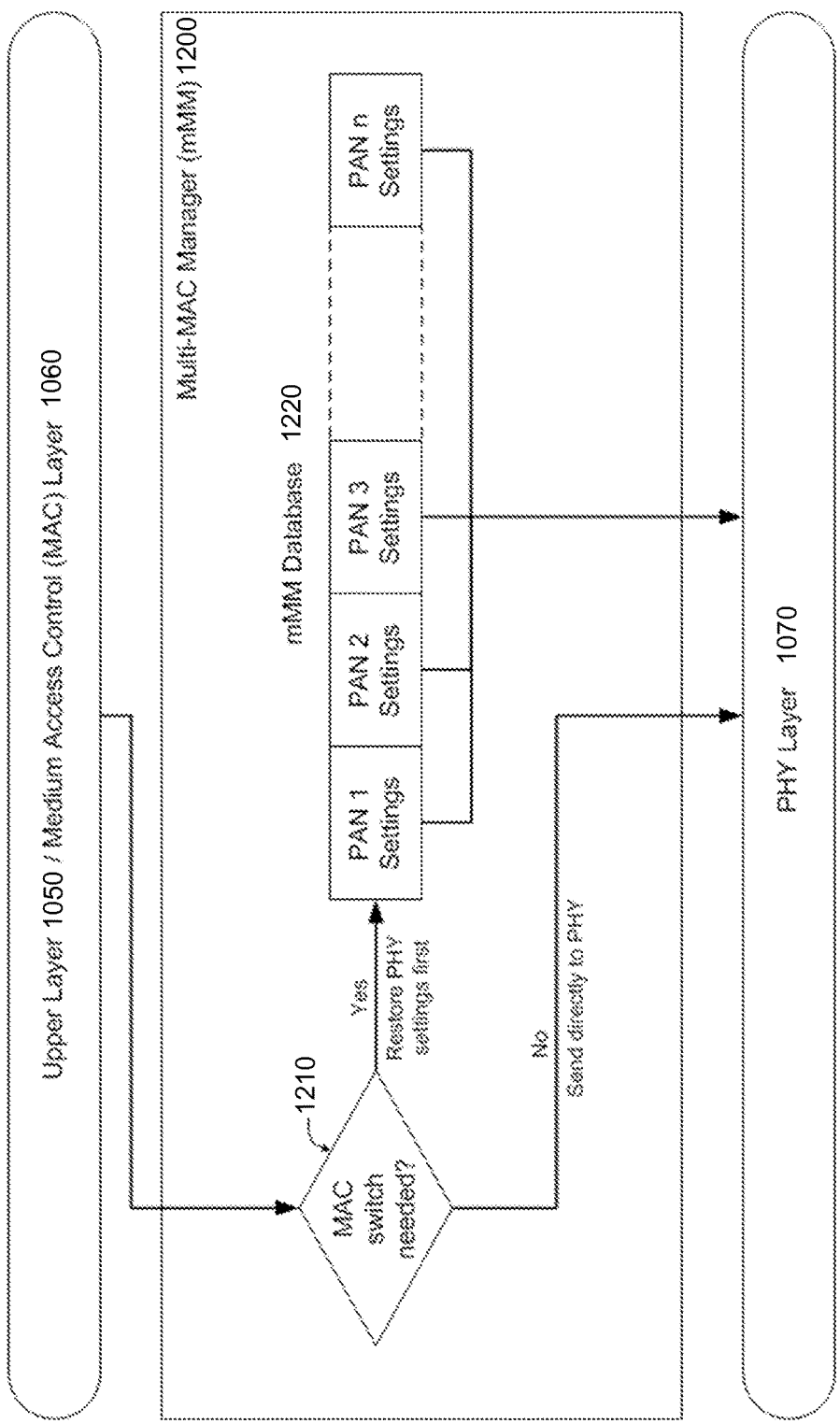
FIG. 13 schematically shows a simplified block diagram of a multi-MAC manager (mMM) according to an example of the present invention.

With reference to FIG. 13, a block diagram schematically showing a multi-MAC manager (mMM) according to an example of the present invention is depicted. The multi-MAC manager (mMM) 1200 comprises a database 1220 with one or more records of settings, wherein each record of settings is provided for a respective medium access control (MAC) instance: The database 1220 and the records of settings thereof are managed by the multi-MAC manager (mMM) 1200. Further, the multi-MAC manager (mMM) 1200 comprises a switching unit 1210, which is configured to detect whether a record of settings should be retrieved from the database 1220 because the physical (PHY) layer and the communication medium is to be allocated to a medium access control (MAC) instance, a settings record relating to which is available in the database 1220. If such allocation to a medium access control (MAC) instance is required, the respective record of settings for the medium access control (MAC) instance is first retrieved from the database 1220 and at least the physical (PHY) layer 1070 is configured accordingly on the basis of the retrieved settings record before any requests are passed to the physical (PHY) 1070 layer. If such configuration is detected not to be necessary because the physical (PHY) 1070 layer and the communication medium is already allocated accordingly, any requests are passed immediately to the physical (PHY) layer 1070. The requests may be issued by any upper layer 1050 or the medium access control (MAC) layer 1060, for instance in response to service invocation thereof.

It should be noted that the database managed by the multi-MAC manager (mMM) according to an example of the present invention may be accessible for read and/or write operations, which means that a settings record may be read from the database 1220 and that a new settings record may be written into the database 1220 including e.g. allocating memory space for storage, overwriting a settings record or deleting one or more settings records before writing. Each settings record may be exposed to one or more of the superposed layers as individual medium access control (MAC) instance e.g. through one or more individual service access points (SAPs) thereof.

Figure 14:
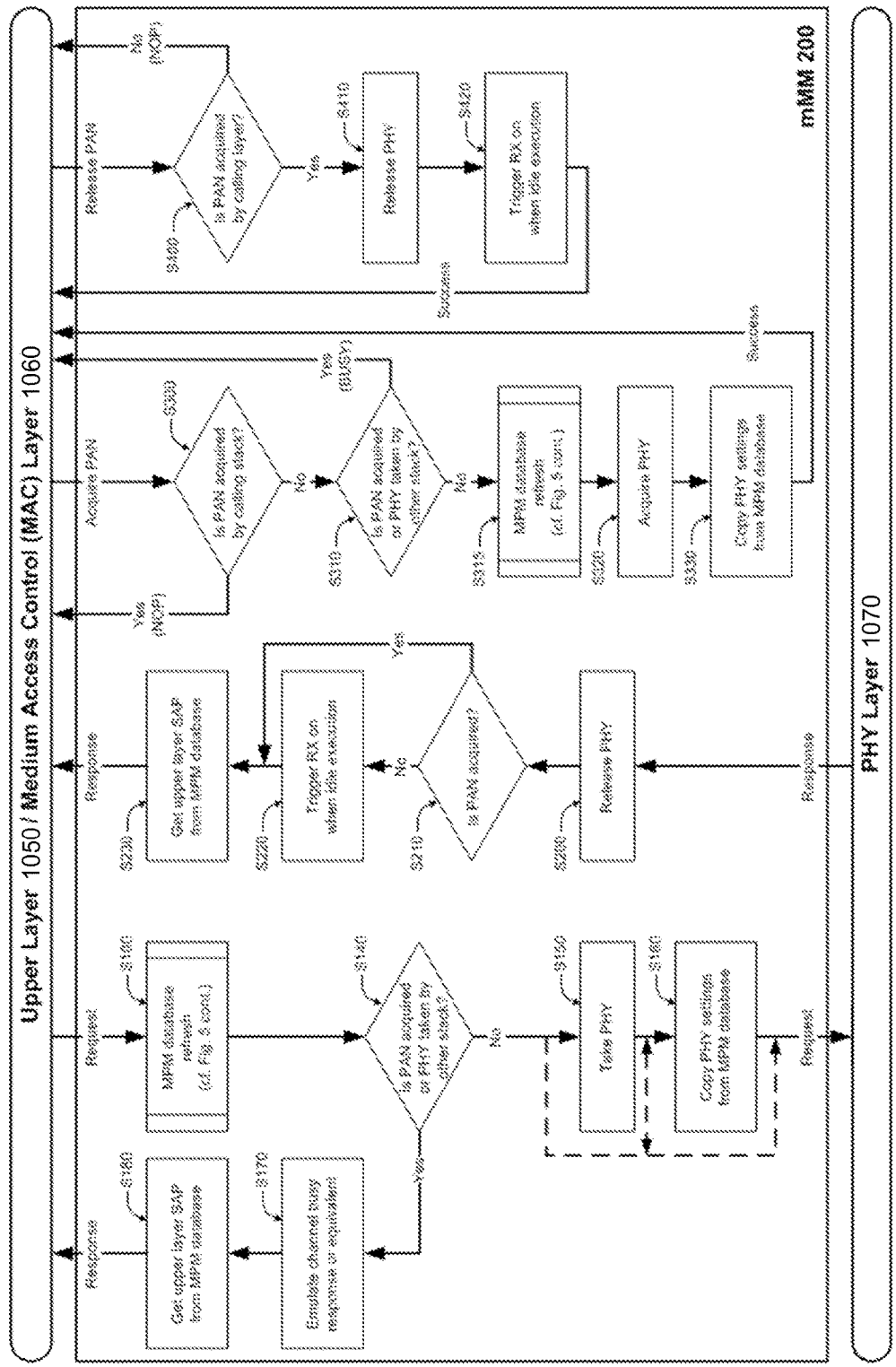
FIG. 14 and FIG. 14 continued (cont.) schematically show flow diagrams illustrating the operations of a multi-MAC manager (mMM) according to an example of the present invention.
Figure 14:
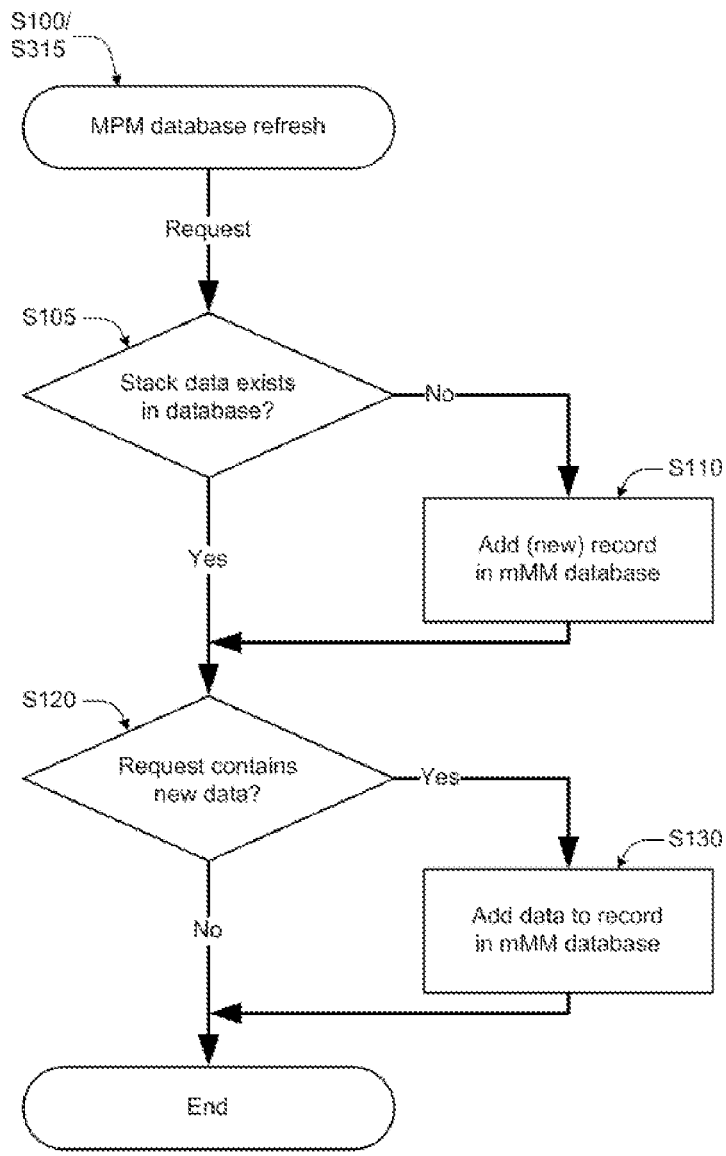

Referring now to FIG. 14 schematically showing flow diagrams, the operation of a multi-MAC manager (mMM) according to an example of the present invention will be described more fully. Those skilled in the art will understand that flow diagrams further illustrate schematically interfaces or service access points (SAPs) of the multi-MAC manager 1200 exposed to layer arranged above the multi-MAC manager 1200 including in particular the upper layers 1050 and the medium access control (MAC) layer 1060, respectively, and the physical (PHY) layer 1070.

A request issued by any upper layer 1050 or the medium access control (MAC) layer 1060 is received by the multi-MAC manager 1200. In an operation S100, it is verified by e.g. the aforementioned switching unit 1210 whether the mMM database 1220 already comprises a settings record in accordance with the request relating to a specific medium access control (MAC) instance or an already existing settings record in the mMM database 1220 may be updated.

The operation of operation S100 is further detailed in FIG. 14 (cont.), where in an operation S105, it is checked whether a settings record corresponding to the received request already exists. In an operation S110, a settings record may be added to the database of the multi-MAC manager (mMM) in case a settings record in accordance with the request does not already exist in the database 1220. A settings record for a new medium access control (MAC) instance is created. The content of the settings record may be obtained from the received request and from previous requests eventually. In an operation S120, the content of the received request may be further analyzed in order to determine whether the content thereof contains new and/or update data, which may be relevant for the settings record. In an operation S130, in case new data, more recent data and/or updated data for the settings record is detected, the respective settings record of the medium access control (MAC) instance, to which the request relates, is updated accordingly in that for instance new data is added to the respective settings record and/or outdated data of the respective settings record is removed and/or replaced with new data.

In an operation S140, it is checked whether the communication medium 1080 or/and the physical (PHY) layer 1070 are available, which means whether the communication medium 1080 or/and the physical (PHY) layer 1070 are currently allocated due to a acquisition request from an upper layer (cf. operation S10 of FIG. 12 and description above referring thereto) or whether the communication medium 1080 or/and the physical (PHY) layer 1070 is currently "taken" by, or allocated to, another medium access control (MAC) instance due to a previous request, which is not completed yet (cf. operations S11/12 and S16 of FIG. 12 and description above referring thereto).

In case the communication medium or/and the physical (PHY) layer 1070 are available for allocation, the request is to be passed to the physical (PHY) layer for further processing. If the communication medium or/and the physical (PHY) layer 1070 is not already allocated to the medium access control (MAC) instance corresponding to the received request (for instance due to a acquisition request), the communication medium or/and the physical (PHY) layer 1070 is "taken", or allocated, at least for this individual received request in an operation S150.

At least the physical (PHY) layer 1070 may require (re-)configuration on the basis of the respective settings record of the medium access control (MAC) instance corresponding to the received request in operation S160 as exemplified with reference to FIG. 13. The components to be configured may comprise inter alia the modem 1002, the transceiver XCVR 1001 and further configurable parts and/or components associated with the physical (PHY) layer 1070. The respective settings record is retrieved from the database 1220 of the multi-MAC manager (mMM) 1200 and the configuration data of the retrieved settings record required for configuration of at least the physical (PHY) layer 1070 is copied therefrom and passed to at least physical (PHY) layer 1070. The request follows once the configuration of at least physical (PHY) layer 1070 has been completed and is processed and further passed by the physical (PHY) layer 1070 configured accordingly to the communication medium 1080. It should be noted that configuration operation S150 and/or operation S160 may be omitted in case the physical (PHY) layer 1070 and the communication medium is already allocated and/or configured in correspondence with the received request. For instance as described in more detail below, the communication medium 1080 or/and the physical (PHY) layer 1070 may be allocated by an acquisition request from an upper layer 1050. Upon such an acquisition request from an upper layer 1050 the communication medium 1080 or/and the physical (PHY) layer 1070 are allocated accordingly until released by a release request from the upper layer 1050, which originally issued the acquisition request preferably.

In case the communication medium or/and the physical (PHY) layer 1070 is not available for allocation because the communication medium 1080 or/and the physical (PHY) layer 1070 is allocated to another medium access control (MAC) instance, the sequence branches after operation S140 to operation S170 and generates a response, which may be dedicated to be passed back to the layer, which has originally issued the request. The response may be generated to represent a physical (PHY) or medium access control (MAC) layer busy response, a channel busy response or any equivalent indication informing a terminating layer that the communication medium or/and the physical (PHY) layer 1070 is currently not available. Information about the interface, through which the response is to be passed back, or the service access point(s)(SAPs), which may should be used, may be retrieved from the database 1220 of the multi-MAC manager (mMM), in particular such information may be obtained from the settings record of the medium access control (MAC) instance, to which the originally issued request relates. It should be noted that the response, e.g. at least a part of the content and/or format thereof, the targeting layer etc. may also be defined in the database 1220 of the multi-MAC manager (mMM), in particular in the settings record of the medium access control (MAC) instance, to which the originally issued request relates. Finally, the response is passed to the targeting layer, which may be the layer, which originally issued the request, through one or more service access points interfacing the communication of data and control information between layers.

The operation of operation S140, where it is checked whether the communication medium 280 or/and the physical (PHY) layer 1070 are available, may be performed repeatedly including for instance a predefined waiting time between each repetition and further for instance over a predefined maximum number of repetitions. Hence, the "unavailability" of the communication medium 1080 or/and the physical (PHY) layer 1070 for allocation may be indicated only after the maximum number of repetitions of the operation of operation S140.

A response received from the communication medium is to be passed to the upper layer in accordance with the allocation of the communication medium 1080 or/and the physical (PHY) layer 1070 at the time of reception of the response. Upon receiving a response from the communication medium 1080 via the physical (PHY) layer 1070, the allocation of the communication medium 1080 or/and the physical (PHY) layer 1070 may be released in an operation S200. Such release of the allocation may be performed provided the allocation has been made in connection with a request as described with reference to operation S150; this means that the release in operation S200 should be omitted if the communication medium 1080 or/and the physical (PHY) layer 1070 has been allocated in connection with a request for acquisition as already mentioned above and described more fully in the following.

In case the communication medium 1080 or/and the physical (PHY) layer 1070 has been released in operation S200 and is not allocated to a medium access control (MAC) instance any more, one or more idle state operations may be executed. As exemplarily illustrated with reference to operation S220, a listen (idle state) operation may be triggered. In case the communication medium 1080 or/and the physical (PHY) layer 1070 is not available for idle state operations, operation S220 is skipped.

In an operation S230, information about the interface, through which the received response is to be further passed, or the service access point(s) (SAPs), which may should be used, and/or the targeting layer may be retrieved from the database 1220 of the multi-MAC manager (mMM), in particular such information may be obtained from the settings record of the medium access control (MAC) instance to which the communication medium 1080 or/and the physical (PHY) layer 1070 has been allocated at the point in time at reception of the response. The response may be passed on in accordance with the retrieved information.

In operations S300 to S330, an exemplary operational sequence of the processing of an acquisition request according to an example of the present invention is shown. In a first operation S300, it is checked whether the communication medium 1080 or/and the physical (PHY) layer 1070 is already allocated to the medium access control (MAC) instance designated in the acquisition request form the upper layer 1050. If the communication medium 1080 or/and the physical (PHY) layer 1070 is already allocated to the requested medium access control (MAC) instance, the operational flow returns to the upper layer 1050. The success of the acquisition request may be indicated to the upper layer 1050, which indication may further signalized to the upper layer that no operation (NOP) has been performed.

In an operation S310, it is checked whether the communication medium 1080 or/and the physical (PHY) layer 1070 are available, which means whether the communication medium 1080 or/and the physical (PHY) layer 1070 are currently allocated due to a acquisition request from an upper layer (cf. operation S10 of FIG. 12 and description above referring thereto) or whether the communication medium 1080 or/and the physical (PHY) layer 1070 is currently "taken" by, or allocated to, another medium access control (MAC) instance due to a previous request, which is not completed yet (cf. operations S11/12 and S16 of FIG. 12 and description above referring thereto).

In case the communication medium or/and the physical (PHY) layer 1070 are available, the right to access the communication medium 1080 or/and the physical (PHY) layer 1070 is exclusively granted to subsequent access operations relating to the medium access control (MAC) instance designated in the acquisition request in an operation S320. In addition, the acquisition request issued by any upper layer 1050 may be verified, e.g. by the aforementioned switching unit 1210 of the multi-MAC manager 1200, in an operation S315 whether the mMM database 1220 already comprises a settings record in accordance with the acquisition request relating to a specific medium access control (MAC) instance or an already existing settings record in the mMM database 1220 may be updated. The operation S315 is described above with reference to operations S100, S105, S110, S120 and S130 with respect to FIG. 14 (cont.); reference is made thereto.

At least the physical (PHY) layer 1070 may require configuration on the basis of the respective settings record of the medium access control (MAC) instance corresponding to the received request in operation S330 as exemplified with reference to FIG. 13. The components to be configured may comprise inter alia the modem 1002, the transceiver XCVR 1001 and further configurable parts and/or components associated with the physical (PHY) layer 1070. The respective settings record is retrieved from the database 1220 of the multi-MAC manager (mMM) 1200 and the configuration data of the retrieved settings record required for configuration of at least the physical (PHY) layer 1070 is copied therefrom and may be passed to at least physical (PHY) layer 1070. The success of the acquisition request may be indicated to the upper layer 1050.

In case the communication medium or/and the physical (PHY) layer 1070 is not available for allocation because the communication medium 1080 or/and the physical (PHY) layer 1070 are allocated to another medium access control (MAC) instance, a failure response, which may be dedicated to be passed back to the layer, which has originally issued the acquisition request. The failure response may be generated to represent a physical (PHY) or medium access control (MAC) layer busy response, a channel busy response or any equivalent indication informing a terminating layer that the communication medium or/and the physical (PHY) layer 1070 is currently not available. Information about the interface, through which the response is to be passed back, e.g. the service access point(s) (SAPs), may be retrieved from the database 1220 of the multi-MAC manager (mMM); in particular such information may be obtained from the settings record of the medium access control (MAC) instance, to which the originally issued request relates. It should be noted that the response, e.g. at least a part of the content and/or format thereof, the targeting layer etc. may also be defined in the database 1220 of the multi-MAC manager (mMM), in particular in the settings record of the medium access control (MAC) instance, to which the originally issued request relates. Finally, the response is passed to the targeting layer, which may be the layer, which originally issued the request, through one or more service access points interfacing the communication of data and control information between layers.

The operation of operation S310, where it is checked whether the communication medium 1080 or/and the physical (PHY) layer 1070 are available, may be performed repeatedly including for instance a predefined waiting time between each repetition and further for instance over a predefined maximum number of repetitions. Hence, the "unavailability" of the communication medium 1080 or/and the physical (PHY) layer 1070 for allocation may be indicated only after the maximum number of repetitions of the operation of operation S310.

One the communication medium 1080 or/and the physical (PHY) layer 1070 are allocated due to an acquisition request, the allocation should be release by a release request, which may indicate, which medium access control (MAC) instance is to be released. In operations S400 to S420, an exemplary operational sequence of the processing of a release request according to an example of the present invention is shown.

In an operation S400, the release request from the upper layer 1050 is parsed and it is verified whether the medium access control (MAC) instance indicated in the release request corresponds to the medium access control (MAC) instance, to which the communication medium 1080 or/and the physical (PHY) layer 1070 are currently allocated. In case the verification of operation S400 does not indicate a match thereof, the operational sequence returns to the upper layer 1050. The failure of the release request may be indicated to the upper layer 1050, which indication may further signalized to the upper layer that no operation (NOP) has been performed.

In case the verification of operation S400 indicates a match, the current allocation is released in an operation S410. Further one or more idle state operations may be executed after release of the allocation in an operation S420. As exemplarily illustrated with reference to operation S420, a listen (idle state) operation may be triggered. Finally, the operational flow returns back to the upper layer 1050 and the success of the release request may be indicated thereto.

Figure 15:
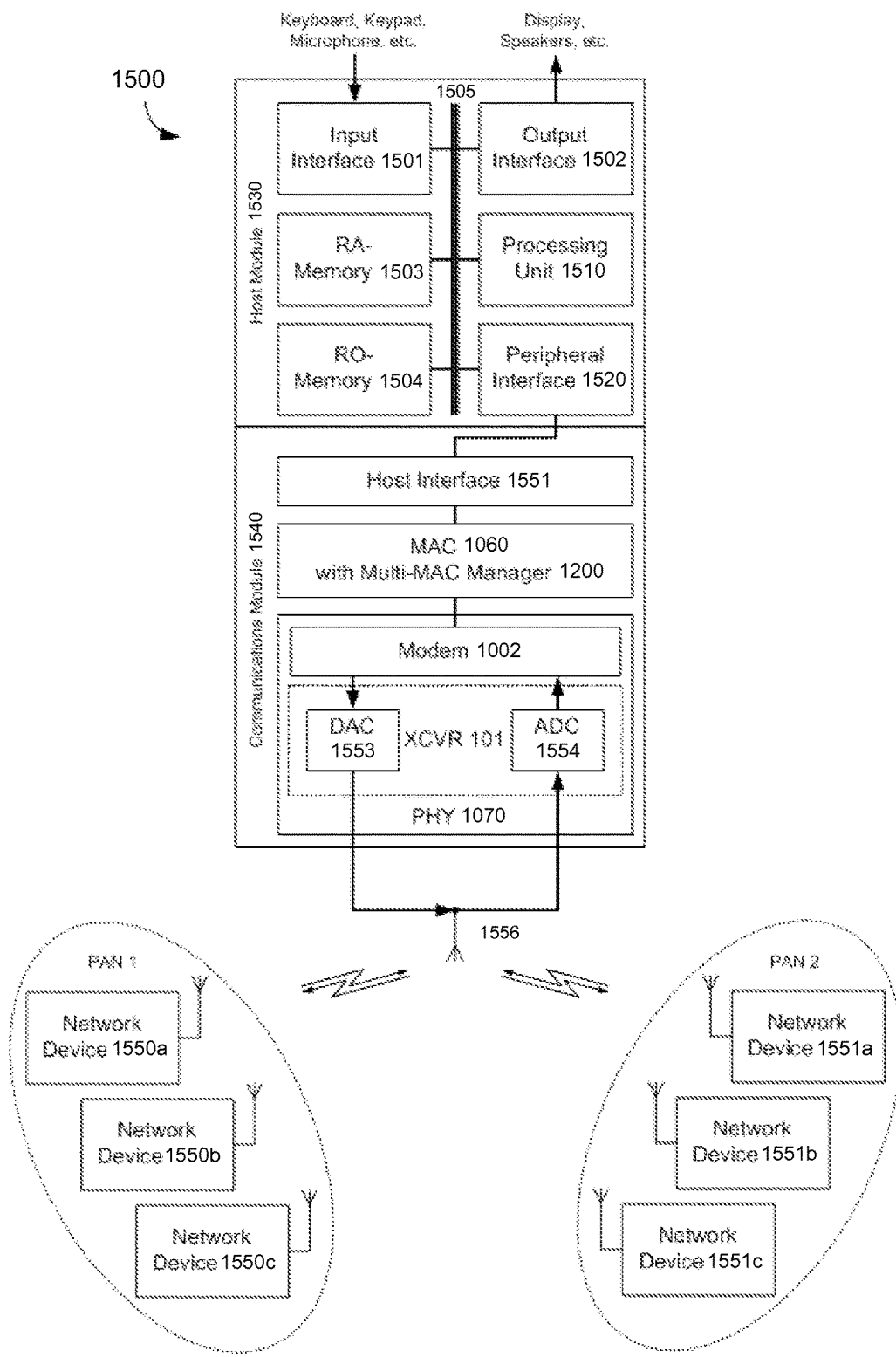
FIG. 15 schematically shows a simplified block diagram of a networking device with a multi-MAC manager (mMM) according to an example of the present invention.

The above-described methodology for managing several network entity instances is applicable with any communications enabled device such as the communications device embodied in FIG. 15 and described with reference thereto in the following. It should be understood that the communications device embodied in FIG. 15 is described with reference to a wireless communications and further in particular with reference to the IEEE 802.15.4 standard only for the sake of non-limiting illustration. The communications enabled device illustrated herein should be also understood to represent a networking device.

FIG. 15 is a schematic block diagram illustrating a communications enabled device 1500 that may be used as full-function device in an 802.15.4 network of wireless devices 1550a to 1550c and wireless devices 1551a to 1551c. As depicted, the communications enabled device 1500 includes the host module 1530 and at least one communications module 1540, which may be integrated with or constructed separately from the components of the host module 1530. It should be understood that the communications enabled device 1500 may be a microcontroller unit (MCU) or a system-on-chip (SoC) being enabled for communication through a communication medium with one or more communications enabled devices. The host module 1530 is exemplified to include a processing unit 1510, random access memory 1503, read-only memory 1504, a peripheral interface 1520, input interface 1501 and output interface 1502, but it will be appreciated that other components and configurations may be used, including but not limited to integrating an embedded microcontroller with associated program and data memory. However configured, the processing module 1510 and memories 1503, 1504 cooperate to provide the specified host functionality, such as for instance a networking function, in which case the processing module 1510 performs the corresponding communications functions in accordance with e.g. one or more wireless communications standards. The components of the host module 1530 are operatably connected via one or more buses 1505, which in particular may include one or more address buses, one or more data buses and/or one or more control buses. For data received from the communications module 1540 (e.g., inbound data), the peripheral interface 1520 provides the data via the bus 1505 to the processing module 1510 for further processing and/or routing to the output interface 1502. The output interface 1502 provides connectivity to one or more output display devices such as a display, monitor, speakers, etc., such that the received data may be displayed. In the other direction, the processing module 1510 may receive the outbound data from one of one or more input devices such as a keyboard, keypad, microphone, sensor, etc. via the input interface 1501 or generate the data itself. For data received via the input interface 1501, the processing module 1510 may perform a corresponding host function on the data and/or route it to a communications module 1540 via the bus 1505 and the peripheral interface 1520, which provides the data to the communications module 1540.

As for the communications module 1540, there is provided a host interface 1551, a media access control protocol (MAC) layer module 1060, one or more separately selectable modem modules 1002, a physical layer module (PHY) 1070, a digital-to-analog converter (DAC) 1553, and an analog-to-digital converter (ADC) 1554 comprised by a transceiver module 1001. Typically, transmit data coming from the host module 1530 is presented to the MAC module 1060 which, in selected examples, provides 802.15.4 compliant hardware support, such as control of packet transmission/reception, security-related encryption, error detection and control, and the like. The MAC module 1060 presents the transmit data to the baseband modems 1002, which modulate the data depending on the selected transmit mode. The data from the selected baseband modem 1002 is presented to the PHY module 1070, which processes the transmit data (encoding, modulation, etc.) and then outputsit to the DAC 1553 for conversion to an analog signal if it has not been converted to the analog signal during the modulation process. The modulated analog signal or DAC output may then be gained, filtered and passed to the antenna section 1556. On the receive side, the antenna section 1556 output is passed to the PHY module 1070 where it is gained, filtered and digitized into a digital signal by the ADC 1554. The digital signal may be further processed by the PHY module 1070 into digital representation and passed to the baseband modems 1002, which demodulate the bits depending on which transmission mode was used to send the received data. The demodulated data is passed through the MAC module 1060 to the host for delivery to the output interface 1551. As will be appreciated, one or more of the modules in the communications module 1540 may be implemented with dedicated hardware, alone or in combination with a communications processor and an associated memory for storing and executing instructions that control the access to the physical transmission medium in the wireless network.

The MAC module 1060 further comprises a multi-MAC manager (mMM) 1200, which allows for (quasi-) simultaneous participation in the first personal area network PAN 1 and communication with the network devices 1550a to 1550c thereof as well as the second personal area network PAN 2 and communication with the network devices 1551a to 1551c thereof. The communications enabled device 1500 exposes different network identities to the personal area networks (PANs) in accordance with to the medium access control (MAC) instances. The multi-MAC manager (mMM) 1200 is configured to manage the medium access control (MAC) instances in accordance with the methodology illustratively described above with reference to FIG. 14.

The methodology illustratively described above with reference to FIG. 14 is also applicable in case the different network identities (and medium access control (MAC) instances, respectively) operate with different roles within the respective network. For the sake of illustration, reference is made the so-called ZigBee communication standard, which designates a specification for a suite of high-level communication protocols used to create personal area networks built from small, low-power digital radios. ZigBee is based on an IEEE 802.15 standard. Though low-powered, ZigBee devices can transmit data over long distances by passing data through intermediate devices to reach more distant ones, creating a mesh network, a network without centralized control, or high-power transmitter/receiver able to reach substantially all of the networked devices. The decentralized nature of such wireless ad hoc networks makes them suitable for applications where a central node may not be relied upon.

The ZigBee standard defines different communication modes including a beacon (BEACON) mode for performing intermittent operations and bandwidth guaranteed communications, and a non-beacon mode for making direct communications mutually among all nodes. The beacon mode is intended to be used in a star network, which is centered at a network management node called the "PAN (Personal Area Network) coordinator." The PAN coordinator periodically transmits a beacon signal, while other nodes make communications within durations assigned thereto in synchronism with the beacon signal. One node assigned by the coordinator can solely occupy a channel to make communications without collisions and is utilized for communications, for which a low latency is required. On the other hand, the non-beacon mode is a mode for accessing channels at all times in accordance with CSMA-CA. When the non-beacon mode is used in a mesh link which directly communicates with peripheral nodes, each node can directly make a communication at all times, but must be waiting for reception such that it can receive data destined thereto at all times, so that the power cannot be saved by intermittent operations as in the beacon mode.

Figure 16A:
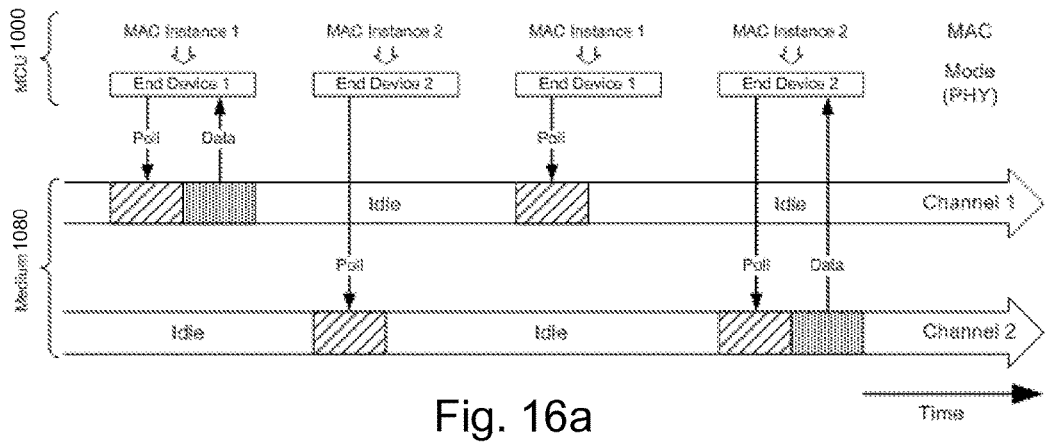
FIGS. 16a to 16c schematically show illustrative timely allocations of a communication medium to a medium access control (MAC) instance according to examples of the present invention.
Figure 16B:
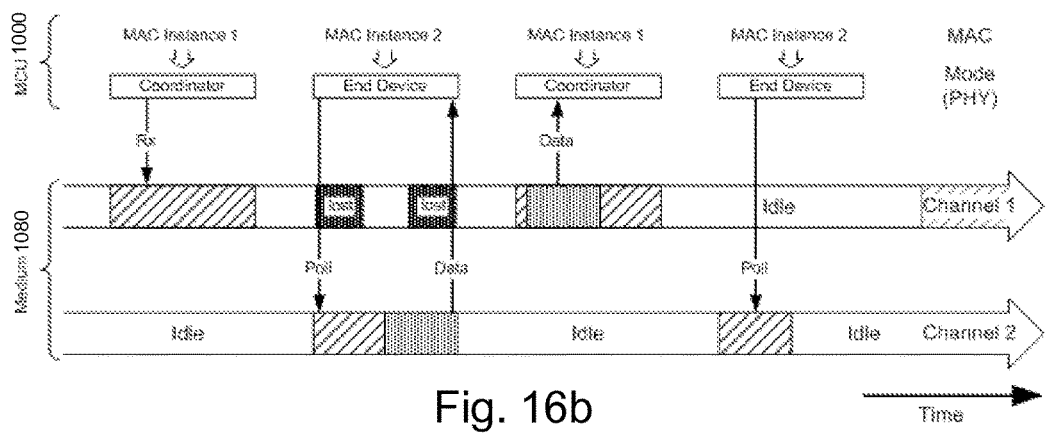
Figure 16C:
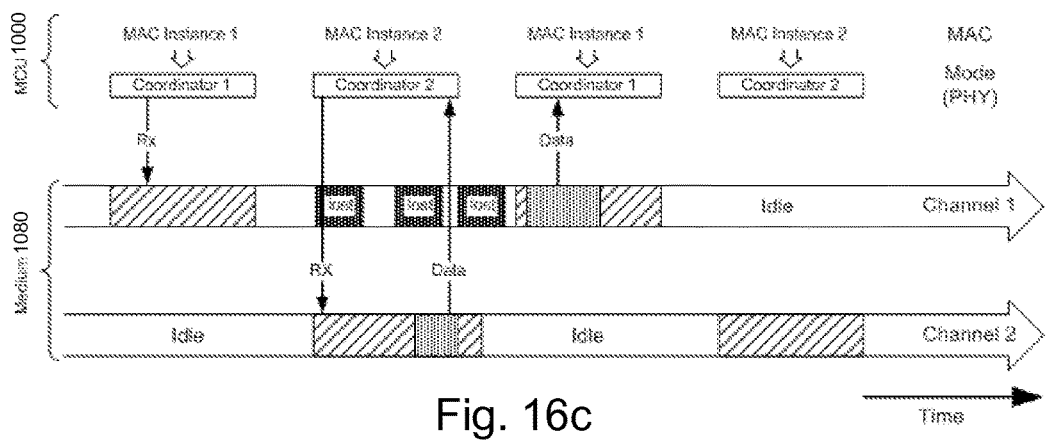

FIGS. 16a to 16c illustrate exemplarily three examples, in which the network identities (and medium access control (MAC) instances, respectively) operate in the same or different communication modes and roles. The communication modes include the so-called "End Device" mode and the so-called "Coordinator" mode. In brief summary, "End Device" mode means inter alia that a poll request is to be sent indicating that data may be transmitted if available. "Coordinator" mode means inter alia that it is listened on the communication medium for targeting data transmissions.

FIG. 16a illustrates an example, where both the medium access control (MAC) instance 1 and medium access control (MAC) instance 2 are defined to instruct and operate in "End Device" communication mode, respectively. The medium access control (MAC) instances 1 and 2 may be allocated in a time sequence, in particular according to a schedule plan. Upon allocation of the respective medium access control (MAC) instance 1 or 2, a poll request is sent, which is responded by a data transmission if data is pending for the respective allocated medium access control (MAC) instance 1 or 2. In particular, the poll requests are transmitted on (virtual or physical) channels 1 and 2 of the communication medium 1080, respectively, each of which channel is associated with the respective medium access control (MAC) instance 1 or 2.

FIG. 16b illustrates an example, where the medium access control (MAC) instance 1 is defined to instruct and operate in "Coordinator" communication mode, respectively, and the medium access control (MAC) instance 2 is defined to instruct and operate in "End Device" communication mode. The medium access control (MAC) instances 1 and 2 may be allocated in a time sequence, in particular according to a schedule plan. Upon allocation of the medium access control (MAC) instance 1, it is listened for data on the communication medium 1080, which is transmitted if there is any pending data for the medium access control (MAC) instance 1. Upon allocation of the medium access control (MAC) instance 2, a poll request is sent, which is responded by a data transmission if data is pending for the allocated medium access control (MAC) instance 2. Data transmission intended for the medium access control (MAC) instance 1 operating in "Coordinator" communication mode may be missed if transmitted during the medium access control (MAC) instance 2 is allocated. In "Coordinator" communication mode, it should be listened on the communication medium for data transmissions all the time since data transmissions may occur at any time. Loss of data due to missed data transmissions may be compensated by data retransmission procedures, which may be carried out by the medium access control (MAC) layer and any of the upper layers. In particular, it is listened for data transmissions on a (virtual or physical) channel 1 of the communication medium 1080, which channel is associated with the medium access control (MAC) instance 1, and the poll requests are transmitted on a (virtual or physical) channel 2 of the communication medium 1080, which channel is associated with the medium access control (MAC) instance 2.

FIG. 16c illustrates an example, where both the medium access control (MAC) instance 1 and medium access control (MAC) instance 2 are defined to instruct and operate in "Coordinator" communication mode, respectively. The medium access control (MAC) instances 1 and 2 may be allocated in a time sequence, in particular according to a schedule plan. Upon allocation of the medium access control (MAC) instance 1 or 2, it is listened for data on the communication medium 1080, which is transmitted if there is any pending data for the respective medium access control (MAC) instance 1 or 2. Data transmission intended for the medium access control (MAC) instance 1 operating in "Coordinator" communication mode may be missed if transmitted during the medium access control (MAC) instance 2 being allocated and data transmission intended for the medium access control (MAC) instance 2 operating in "Coordinator" communication mode may be missed if transmitted during the medium access control (MAC) instance 1 being allocated. Loss of data due to missed data transmissions may be compensated by data retransmission procedures, which may be carried out by the medium access control (MAC) layer and any of the upper layers. In particular, it is listened for data transmissions on (virtual or physical) channels 1 and 2 of the communication medium 1080, respectively, each of which channel is associated with the respective medium access control (MAC) instance 1 and 2.

According to an example of the present application, a networking device 1500 is provided, which comprises a processing enabled host module 1530, a network communications interface 1540 and a multi-MAC manager 1200. The network communications interface 1540 comprises a physical layer, PHY, part 1070 and a medium access control, MAC, part 1060 and is operably connected to the processing enabled host module 1530 to provide data communication service to one or more applications 1004 executed thereat. The multi-MAC manager 1200 is operably connected to the medium access control, MAC, part 1060, and the PHY part 1070 and comprises a storage 1220 for storing several medium access control, MAC, instances. Each MAC instance has a network identity for being exposed via the communications interface 1540 on a communication medium 1080. The network identities are different from each other. An application making use of the data communications services of the network communications interface 1540 requests the data communications service via a MAC instance of the multi-MAC manager 1200. The multi-MAC manager 1200 configures the network communication interface 1540 to acquire a respective network identify in accordance with the MAC instance. The requested data communications service are performed in the context of the acquired network identify. The MAC manager 1200 is configured to receive a request issued in the context of a medium access control, MAC, instance, to determine S100 the MAC, instance, to which the request relates, and to determine S140 whether the PHY part 1070 is available for allocation or already allocated to the MAC instance. If the PHY is available, The MAC manager 1200 is further configured to allocate S150, S160 at least the PHY part 1070 of the communications interface 1540 to the MAC instance and to pass the received request to the PHY part 1070 of the communications interface 1540 for further processing thereat. The MAC manager 1200 is further configured to release at least the allocated PHY part 1070 of the communications interface 1540 once a service requested by the received request is completed.

According to an example of the present application, the MAC manager 1200 is further configured to receive a request to acquire the network identify of a MAC instance. Upon receipt of such a request, the MAC manager 1200 is configured to determine whether the PHY part is available for allocation or already allocated to the MAC instance and allocate at least the PHY part of the communications interface to the requested MAC instance if the PHY part is available. Upon allocation, the allocated PHY part 1070 of the communications interface 1540 is exclusively available for communications transactions relating to the acquired network identify until released in response to receipt of a request to release. The MAC manager 1200 is further configured to receive a request to release an acquired network identity and release the PHY part 1070 of the communications interface 1540 upon reception of a request to release the acquired network identity. The request to release an acquired network identity is a valid request if the request origins from the entity, which has issued the previous request for acquiring the network identity. The entity may be at least one of an application and an upper layer part of the communication stack associated with the MAC instance including among others the MAC layer.

According to an example of the present application, the PHY part is available for allocation if the PHY part is not allocated to another MAC instance of if the PHY part 1070 is not acquired by a network identity of another MAC instance. The PHY part is also available if the network communications interface currently performs an idle operation.

According to an example of the present application, the communications interface is configured to listen on the communication medium for data destined for one or the medium access control, MAC, instances in idle operation.

According to an example of the present application, the networking device further comprises a database 1220, which is configured to store several medium access control, MAC, instances. The database 1220 comprises settings records, each of which relates to one or the MAC instances. The networking device further comprises a switching unit 1210. The switching unit 1210 is configured to retrieve a settings record in accordance with a MAC instance and to provide the retrieved settings record to at least the PHY part 1070 for configuring at least the PHY part 1070 of the communications interface 1540 upon allocation thereof to the MAC instance such that the communication interface acquires the network identify of the MAC instance.

According to an example of the present application, the multi-MAC manager 1200 is further configured to provide settings data to one or more components of at least the PHY part 1070 of the communications interface 1540 upon allocation thereof.

According to an example of the present application, the multi-MAC manager 1200 is part of the medium access control, MAC, part 1060 of the communications interface 1540.

According to an example of the present application, the MAC instances are available for concurrent use from a point of view of an application carried out at the networking device and the communications interface exposes only one network identify corresponding to the allocated MAC instance at the same time from network point of view.

According to an example of the present application, each MAC instance is part of a separate and individual protocol stack providing the data communications service to one or more applications carried out at the networking device 1500.

According to an example of the present application, the MAC manager 1200 is further configured to analyze the received request and to determine whether the request relates to a new MAC instance, which is not part of the stored MAC instances. If the request relates to a new MAC instance, the MAC manager 1200 is further configured to create a new MAC instance on the basis of information obtained from the received request. The new MAC instance is stored in the storage 1220.

According to an example of the present application, if the request relates to a MAC instance being part of the stored MAC instances the MAC manager 1200 is further configured to update the stored MAC instance on the basis of information obtained from the received request.

According to an example of the present application, the MAC part 1060 and the PHY part 1070 are part of a stack implementation in accordance with at least one of the Bluetooth standard issued by the Bluetooth Special Interest Group (SIG), the Institute of Electrical and Electronics Engineers, IEEE, standard 802.x, and the ZigBee standard issued by the ZigBee Alliance. In particular, the MAC part 1060 and the PHY part 1070 are part of a stack implementation in accordance with the IEEE standards 802.15.x, more particularly the IEEE standard 802.15.4.

According to an example of the present application, a method of operating a networking device 1500 is provided. A request issued in the context of a medium access control, MAC, instance, is received at a multi-MAC manager 1200 of a communication interface 1540 of the networking device 1500. The network communications interface 1540 comprises a physical layer, PHY, part 1070 and a medium access control, MAC, part 1060 and is operably connected to a processing enabled host module 1530 of the networking device 1500. The network communications interface 1540 provides data communications service to one or more applications 1004 executed at the processing enabled host module 1530 of the networking device 1500. The MAC instance is determined, to which the request relates among a several medium access control, MAC, instances stored at a storage 1220 of the MAC manager 1200. Each MAC instance has a network identity for being exposed via the communications interface 1540 on a communication medium 1080. The network identities are different from each other. It is determined whether the PHY part 1070 is available for allocation or already allocated to the MAC instance. If the PHY is available, at least the PHY part 1070 of the communications interface 1540 is allocated to the MAC instance. The received request is passed to the PHY part 1070 of the communications interface 1540 for further processing thereat. At least the allocated PHY part 1070 of the communications interface 1540 is released once a service requested by the received request is completed.

According to an example of the present application, a request to acquire the network identify of a MAC instance is received. It is determined whether the PHY part 1070 is available for allocation or already allocated to the MAC instance. If the PHY part 1070 is available, at least the PHY part 1070 of the communications interface 1540 is allocated to the requested MAC instance. The allocated PHY part 1070 of the communications interface 1540 is provided exclusively for communications transactions relating to the acquired network identity of the MAC instance until released in response to receipt of a request to release. Upon receiving a request to release the acquired network identity of the MAC instance, the acquired PHY part 1070 of the communications interface 1540 is released upon reception of a request to release.

According to an example of the present application, during the communications interface 1540 being in idle operation, it is listened on the communication medium 1080 for data destined for one or the medium access control, MAC, instances.

According to an example of the present application, the allocating of at least the PHY part 1070 of the communications interface 1540 further comprises retrieving settings information from the storage 1220 and configuring at least the PHY part 1070 on the basis of the retrieved settings information. Each of the MAC instances stored at the storage 1220 comprises settings information relating to the respective MAC instance. The settings information enable to configure at least the PHY part of the communications interface 1540 such that the network identity of the MAC instance is exposed on the communication medium 1080.

According to an example of the present application, the received request is analyzed S100 and it is determined S105 whether the request relates to a new MAC instance, which is not part of the stored MAC instances. If the request relates to a new MAC instance, a new MAC instance is created S110 on the basis of information obtained from the received request.

According to an example of the present application, if the request relates to a MAC instance being part of the stored MAC instances, it is determined S120 whether the request include new data and the stored MAC instance is updated S130 on the basis of information obtained from the received request.

According to an example of the present application, if the PHY part 1070 is unavailable (not available), a busy response is emulated or generated and the emulated busy response is transmitted to the source of the request.

The above advantages are exemplary and these or other advantages may be achieved by the proposed solution. Further, the skilled person will appreciate that not all advantages stated above are necessarily achieved by examples described herein.

The proposed solution may also be implemented in a computer program product stored in a non-transitory computer-readable storage medium that stores computer-executable code, which causes a processor computer to perform the operation of the multi-MAC manager 1200 and/or the exemplary method as illustrated in FIGS. 13 and 14, for instance.

An operating system (OS) is the software that manages the sharing of the resources of a computer and provides programmers with an interface used to access those resources. An operating system processes system data and user input, and responds by allocating and managing tasks and internal system resources as a service to users and programs of the system.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-ROM or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, circuit details have not been explained in any greater extent than that considered necessary, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/ dynamic load library and/or other sequence of instructions designed for execution on a computer system.

Furthermore, although FIGS. 1-4 and the discussion thereof describe an exemplary information processing architecture, this exemplary architecture is presented merely to provide a useful reference in discussing various aspects of the invention. The description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein, for example applications, may be received in elements of device 101, for example, from computer readable media such as memory or other media on other computer systems. Such computer readable media may be permanently, removably or remotely coupled to an information processing system such as application 106a, 106b. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, device 101 is a computer system such as a personal computer system but may also be a mobile device such as a laptop, tablet, smartphone or other phone system, a palm held or other hand held device, or other mobile device, or a fixed device such as a household computerised device or other control device. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

Also, devices functionally forming separate devices may be integrated in a single physical device. Also, the units and circuits may be suitably combined in one or more semiconductor devices.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A networking device for connection to a plurality of personal area networks and arranged to operate according to a layer model which comprises:
   a PHY layer according to the layer model;
   at least a first MAC layer and a second MAC layer according to the layer model; and
   a third layer according to the layer model situated functionally between the PHY layer and the at least first and second MAC layers, and:
   the first MAC layer arranged to support a first protocol stack to access a first respective PAN using frequency hopping spread spectrum techniques and a first set of parameters;
   the second MAC layer arranged to support a second protocol stack to access a second respective PAN using frequency hopping spread spectrum techniques and a second set of parameters;
   the first MAC layer arranged to provide the first set of parameters to the third layer;
   the second MAC layer arranged to provide the second set of parameters to the third layer; and
   the third layer arranged to:
      allocate access to the PHY layer to both the first and second MAC layers in accordance with their respective sets of parameters; and
      detect when the first and second MAC layers require access to the PHY layer for, respectively, an Rx action and a Tx action via time slots which overlap, and is arranged to:
         shift the Tx action towards an edge of the respective timeslot as much as action duration allows in order to be successfully performed, and grant access to the MAC layer for the duration of that action; and
         grant the MAC layer requiring access for an Rx action access to the PHY layer for the remainder of the overlap period between the two timeslots.

2. The networking device of claim 1 wherein the first and second set of parameters include at least the following information for time slots allocated to actions to be performed by the first and second MAC layers according to respective first and second frequency hopping patterns:
   action duration, where action duration is duration of a transmission action or duration of a receiving action;
   absolute start time for the allocated time slot for the Tx action or the Rx action;
   time slot duration for the allocated time slot.

3. The networking device of claim 2, wherein the third layer is further arranged to grant to any MAC layer of the at least first and second MAC layers, and according to its respective allocated time slot, access to the PHY layer if the PHY layer is idle.

4. The networking device of claim 3 wherein the third layer is further arranged to defer any Tx or Rx action within its allocated time slot as much as its duration allows.

5. The networking device of claim 1, wherein:
   the third layer is further arranged to detect when the first and second MAC layers require access to the PHY layer for Rx actions via time slots which overlap, and is arranged to:
      alternate access to the PHY layer for the first and second MAC layers with a dwell time until an incoming signal is detected for one of the MAC layers;
      allocate the PHY layer to the respective MAC layer until the Rx action is completed;
      allocate the PHY layer to the other MAC layer after the Rx action is completed.

6. The networking device of claim 5 wherein:
   the incoming signal is a preamble for an incoming packet; and
   the Rx action is receipt of a frame.

7. The networking device of claim 1, wherein when the Rx action is receipt of a packet which cannot be fully received in the remaining overlap period, the third layer is arranged to discard the packet.

8. The networking device of claim 1, wherein:
   the third layer is further arranged to detect when the first and second MAC layers require access to the PHY layer for Tx actions via time slots which overlap, and is arranged to:
      shift Tx actions as much as possible towards the edges of their respective time slot while ensuring that they do not overlap;
      when a Tx action starts, grant the respective MAC layer access to the PHY layer and increase a priority of the other MAC layer if that MAC layer requires access to the PHY layer during the Tx action, and reduce the priority again if that MAC layer subsequently transmits; and
      during any subsequent conflict, grant access to the MAC layer with the highest priority.

9. A method of connecting a networking device to a plurality of personal area networks (PANS), the method being executed on a device arranged to operate according to a layer model which comprises:
   a PHY layer according to the layer model;
   at least a first MAC layer and a second MAC layer according to the layer model; and
   a third layer according to the layer model situated functionally between the PHY layer and the at least first and second MAC layers, and:
   the first MAC layer being arranged to support a first protocol stack arranged to access a first respective PAN using frequency hopping spread spectrum (FHSS) techniques and a first set of parameters;
   the second MAC layer being arranged to support a second protocol stack arranged to access a second respective PAN using frequency hopping spread spectrum (FHSS) techniques and a second set of parameters; the method comprising:
   the first MAC layer providing the first set of parameters to the third layer;
   the second MAC layer providing the second set of parameters to the third layer; and
   the third layer:
      allocating access to the PHY layer to both the first and second MAC layers in accordance with their respective sets of parameterss;
      detecting when the first and second MAC layers require access to the PHY layer for, respectively, an Rx action and a Tx action via time slots which overlap,
      shifting the Tx action towards an edge of the respective timeslot as much as action duration allows in order to be successfully performed and granting access to the MAC layer for the duration of that action; and granting the MAC layer requiring access for an Rx action access to the PHY layer for the remainder of the overlap period between the two timeslots.

10. The method of claim 9, wherein the first and second set of parameters include at least the following information for time slots allocated to actions to be performed by the first and second MAC layers according to respective first and second frequency hopping patterns:
   action duration, where action duration is duration of a transmission action or duration of a receiving action;
   absolute start time for the allocated time slot for the Tx action or the Rx action;
   time slot duration for the allocated time slot.

11. The method of claim 10, the third layer further:
   granting to any MAC layer of the at least first and second MAC layers, and according to its respective allocated time slot, access to the PHY layer if the PHY layer is idle.

12. The method of claim 11, the third layer further:
   deferring any Tx or Rx action within its allocated time slot as much as its duration allows.

13. The method of any of claim 9, the third layer further:
   detecting when the first and second MAC layers require access to the PHY layer for Rx actions via time slots which overlap, and
   alternating access to the PHY layer for the two MAC layers with a dwell time until an incoming signal is detected for one of the MAC layers;
   allocating the PHY layer to the respective MAC layer until the Rx action is completed; and
   allocating the PHY layer to the other MAC layer after the Rx action is completed.

14. The method of claim 9, wherein when the Rx action is receipt of a packet which cannot be fully received in the remaining overlap period, the third layer
   discards the packet.

15. The method of claim 9, the third layer further:
   detecting when the first and second MAC layers require access to the PHY layer for Tx actions via time slots which overlap;
   shifting Tx actions as much as possible towards the edges of their respective time slot while ensuring that they do not overlap;
   when a Tx action starts, granting the respective MAC layer access to the PHY layer and increasing a priority of the other MAC layer if that MAC layer requires access to the PHY layer during the Tx action, reducing the priority again if that MAC layer subsequently transmits; and
   during any subsequent conflict, granting access to the MAC layer with the highest priority.

16. A networking system according to claim 1 comprising:
   at least one networking device as claimed in claim 1; and
   a plurality of Personal Area Networks.

17. A computer program product for comprising instructions for causing a networking device comprising:
   a PHY layer according to a layer model;
   at least a first MAC layer and a second MAC layer according to the layer model; and
   a third layer according to the layer model situated functionally between the PHY layer and the at least first and second MAC layers, and:
   the first MAC layer being arranged to support a first protocol stack arranged to access a first respective PAN using frequency hopping spread spectrum techniques and a first set of parameters;
   the second MAC layer being arranged to support a second protocol stack arranged to access a second respective PAN using frequency hopping spread spectrum techniques and a second set of parameters;
   to perform a method of:
   the first MAC layer providing the first set of parameters to the third layer;
   the second MAC layer providing the second set of parameters to the third layer; and
   the third layer:
   allocating access to the PHY layer to both the first and second MAC layers in accordance with their respective sets of parameters;
   detecting when the first and second MAC lavers require access to the PHY layer for, respectively, an Rx action and a Tx action via time slots which overlap;
   shifting the Tx action towards an edge of the respective timeslot as much as action duration allows in order to be successfully performed and granting access to the MAC layer for the duration of that action; and
   granting the MAlayer requiring access for an Rx action access to the PHY layer for the remainder of the overlap period between the two timeslots.

* * * * *